(12) United States Patent
Kaede

(10) Patent No.: US 11,693,615 B2
(45) Date of Patent: *Jul. 4, 2023

(54) ELECTRONIC DEVICE AND NON-TRANSITORY COMPUTER READABLE MEDIUM FOR PERFORMING DISPLAY CONTROL IN RESPONSE TO CHANGE OF FOLDING ANGLE

(71) Applicant: FUJIFILM Business Innovation Corp., Tokyo (JP)

(72) Inventor: Ikumi Kaede, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/830,584

(22) Filed: Jun. 2, 2022

(65) Prior Publication Data

US 2022/0291891 A1 Sep. 15, 2022

Related U.S. Application Data

(63) Continuation of application No. 16/983,845, filed on Aug. 3, 2020, now Pat. No. 11,392,340.

(30) Foreign Application Priority Data

Mar. 4, 2020 (JP) .............................. JP2020-036545

(51) Int. Cl.
*G06F 3/14* (2006.01)
*G06F 3/041* (2006.01)
(Continued)

(52) U.S. Cl.
CPC .......... *G06F 3/1446* (2013.01); *G06F 1/1641* (2013.01); *G06F 1/1652* (2013.01); *G06F 1/3212* (2013.01); *G06F 3/041* (2013.01)

(58) Field of Classification Search
CPC .... G06F 1/1652; G06F 3/0488; G06F 3/1446; G06F 1/3212; G06F 1/1616;
(Continued)

(56) References Cited

U.S. PATENT DOCUMENTS

2015/0199125 A1 7/2015 Tsukamoto et al.
2020/0249897 A1* 8/2020 de Paz ................ G06F 3/04883
(Continued)

FOREIGN PATENT DOCUMENTS

| JP | 2006-42400 A | 2/2006 |
|---|---|---|
| JP | 2006-174506 A | 6/2006 |
| JP | 2015-132965 A | 7/2015 |

*Primary Examiner* — Yaron Cohen
(74) *Attorney, Agent, or Firm* — Oliff PLC

(57) ABSTRACT

A foldable device with a folding portion comprises a processor, a first display, and a second display. When the device is closed, only one of the first display and the second display is capable of presenting information to a user. The processor is configured to perform, in response to a change in a folding angle of the folding portion within a predetermined time from a user operation received on one of the first display and the second display, second display control on an other one of the first display and the second display, wherein the second display control on the other one of the first display and the second display is in accordance with content displayed at a point that received the user operation.

18 Claims, 40 Drawing Sheets

(51) Int. Cl.
*G06F 1/3212* (2019.01)
*G06F 1/16* (2006.01)

(58) Field of Classification Search
CPC ... G06F 1/1641; G06F 3/041; G09G 2380/02; G09G 2340/0442
See application file for complete search history.

(56) References Cited

U.S. PATENT DOCUMENTS

2020/0264826 A1* 8/2020 Kwon ............... G06F 9/451
2021/0108677 A1* 4/2021 Bae ................. G06F 1/1656

* cited by examiner

FIG. 9

| Received | From : Sato |
| Sato | To : Kenji Kato |
| Suzuki | Title : Thanks! |
| Ueno | |
| Tanaka | Hi, Kenji ! |
| Saito | |

| Received | From : Suzuki |
| Sato | To : Kenji Kato |
| Suzuki | Title : Invitation |
| Ueno | |
| Tanaka | Dear Kenji. |
| Saito | Hello! I am inviting you to ... |

| Suzuki ..... | 1/10/2020 |
| Suzuki ..... | From:Suzuki To:Yamamoto Title: Meeting |
| Suzuki ..... | |
| Suzuki ..... | Thank you for your help. ... |

| | |
|---|---|
| Suzuki <br> Thank you for your | |
| Sato <br> Thank you as always | —101 |
| Yamada <br> About the meeting | |
| Okamoto <br> I'll be late | |

FIG. 31

| Sato Hanako<br>・・・・・・ | 1/10/2020<br>From:Sato<br>To:Yamamoto |
| --- | --- |
| Sato Hanako<br>・・・・・・ | |
| Sato Hanako<br>・・・・・・ | Hello, ··· |
| Sato Hanako<br>・・・・・・ | |

| 🔍 Sato  [CANCEL] | 1/10/2020<br>From:Sato<br>To:Yamamoto |
| --- | --- |
| Sato Taro<br>・・・・・・ | |
| Sato Jiro<br>・・・・・・ | Hello, ··· |
| Sato Hanako<br>・・・・・・ | |
| Sato Momoko<br>・・・・・・ | |

102

ELECTRONIC DEVICE AND NON-TRANSITORY COMPUTER READABLE MEDIUM FOR PERFORMING DISPLAY CONTROL IN RESPONSE TO CHANGE OF FOLDING ANGLE

CROSS-REFERENCE TO RELATED APPLICATIONS

This application is based on and claims priority under 35 USC 119 from Japanese Patent Application No. 2020-036545 filed Mar. 4, 2020.

BACKGROUND

(i) Technical Field

The present disclosure relates to an electronic device and a non-transitory computer readable medium.

(ii) Related Art

Japanese Unexamined Patent Application Publication No. 2006-42400 discloses a mobile communication terminal including: a display sheet that includes a screen display and that is flexible, the display sheet being, from a user's perspective, horizontally foldable across at least one line in a vertical direction (foldable in such a manner that, when folded, the area of a surface facing the user becomes substantially half the size before being folded); and a speaker and a microphone provided on either a left or right approximately half of a surface opposite to a surface where the screen display of the display sheet is provided, the speaker and the microphone being for having wireless conversations with another person at a remote place.

There is an electronic device that is configured to be foldable by a folding portion and that has a display on inside and outside when folded. Such an electronic device may provide various types of display if content displayed on the display is controllable depending on the case where the electronic device is folded and the case where the electronic device is expanded.

SUMMARY

Aspects of non-limiting embodiments of the present disclosure relate to providing an electronic device that is configured to be foldable by a folding portion and that has a display on inside and outside when folded, which is capable of providing various types of display by controlling content displayed on the display in detail, and a non-transitory computer readable medium storing a computer program that runs on the electronic device.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a foldable device with a folding portion comprising a processor, a first display, and a second display. When the device is closed, only one of the first display and the second display is capable of presenting information to a user. The processor is configured to perform, in response to a change in a folding angle of the folding portion within a predetermined time from a user operation received on one of the first display and the second display, second display control on an other one of the first display and the second display, wherein the second display control on the other one of the first display and the second display is in accordance with content displayed at a point that received the user operation.

BRIEF DESCRIPTION OF THE DRAWINGS

An exemplary embodiment of the present disclosure will be described in detail based on the following figures, wherein:

FIG. 9 is a diagram illustrating a display example;
FIG. 10 is a diagram illustrating a display example;
FIG. 19 is a diagram illustrating a display example;
FIG. 21 is a diagram illustrating a display example;
FIG. 31 is a diagram illustrating a display example;
FIG. 32 is a diagram illustrating a display example.

DETAILED DESCRIPTION

Figure 1:
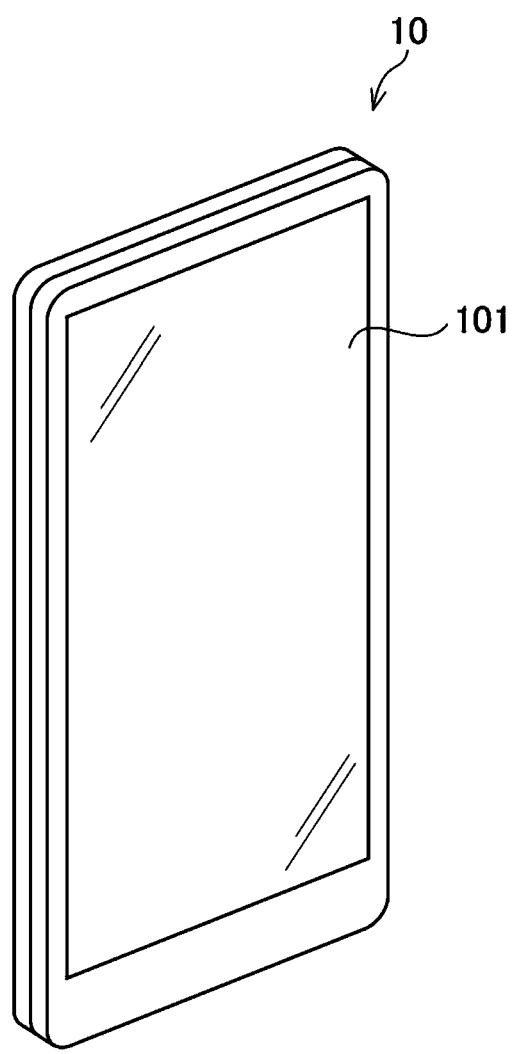
FIG. 1 is a diagram illustrating an exemplary appearance of an electronic device according to an exemplary embodiment.

Hereinafter, an exemplary embodiment of the present disclosure will be described with reference to the drawings. Note that the same or equivalent elements and parts in the drawings are given the same reference numeral. In addition, the dimensional ratios in the drawings are exaggerated for convenience of description, and may differ from the actual ratios.

Figure 2:
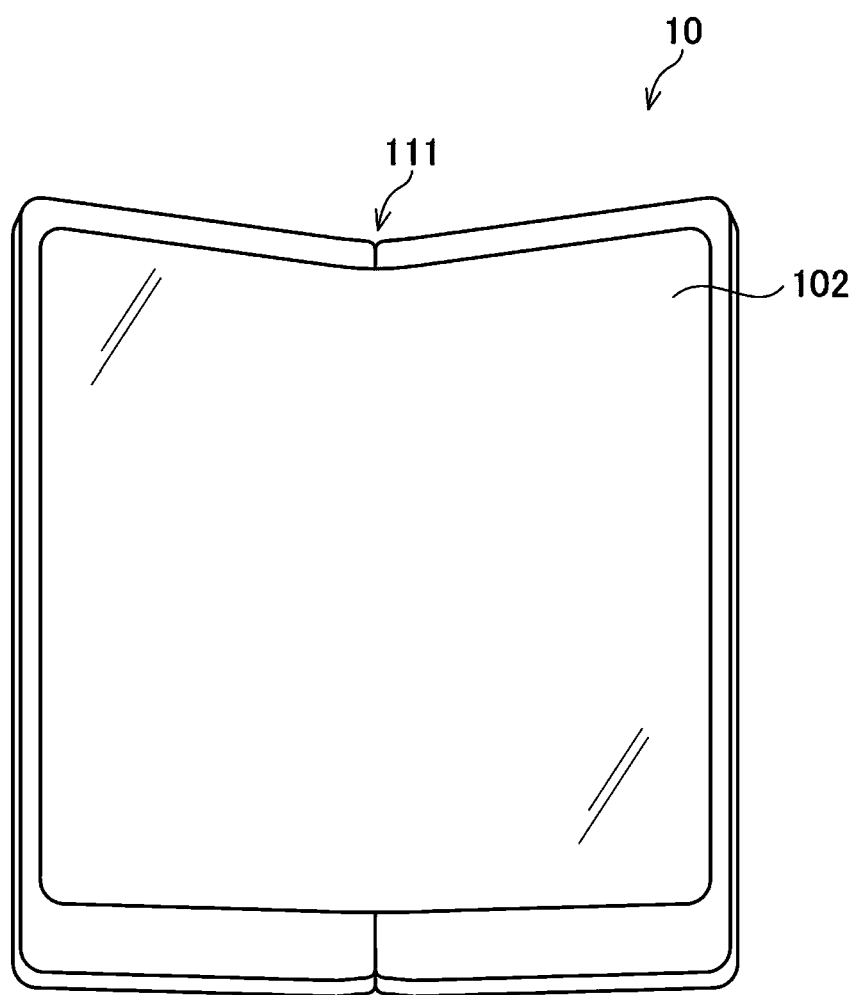
FIG. 2 is a diagram illustrating an exemplary appearance of the electronic device according to the present exemplary embodiment.

FIGS. 1 and 2 are diagrams each illustrating an exemplary appearance of an electronic device according to the present exemplary embodiment. An electronic device 10 according to the present exemplary embodiment is, for example, a device with a size that may be carried by a user. The electronic device 10 according to the present exemplary embodiment is a device that is foldable by a folding portion 111 at the center. Since the electronic device 10 according to the present exemplary embodiment is foldable by the folding portion 111 at the center, the electronic device 10 may be easily carried by the user, as compared with the case where the electronic device 10 is not folded.

The electronic device 10 according to the present embodiment includes a first display 101 on outside and a second display 102 on inside when folded by the folding portion 111. That is, the first display 101 is an example of an outer display, and the second display 102 is an example of an inner display. The first display 101 and the second display 102 are displays capable of detecting a contact operation performed by the user's finger(s), a stylus, or the like, and each have a touchscreen. In addition, the second display 102 is flexible so as not to be damaged when the electronic device 10 is folded by the folding portion 111.

The electronic device 10 according to the present exemplary embodiment is capable of executing various processes in accordance with a contact operation on the first display 101 and the second display 102. The electronic device 10 according to the present exemplary embodiment may provide the user to control content displayed in the two displays in various ways. Examples of display control of the displays will be described in detail later.

Although the electronic device 10 according to the present exemplary embodiment has a configuration that is foldable by the folding portion 111 in only one direction, the present disclosure is not limited to this example. In addition, the folding position is not limited to the center, and the number of folding positions is not limited to one.

Figure 3:
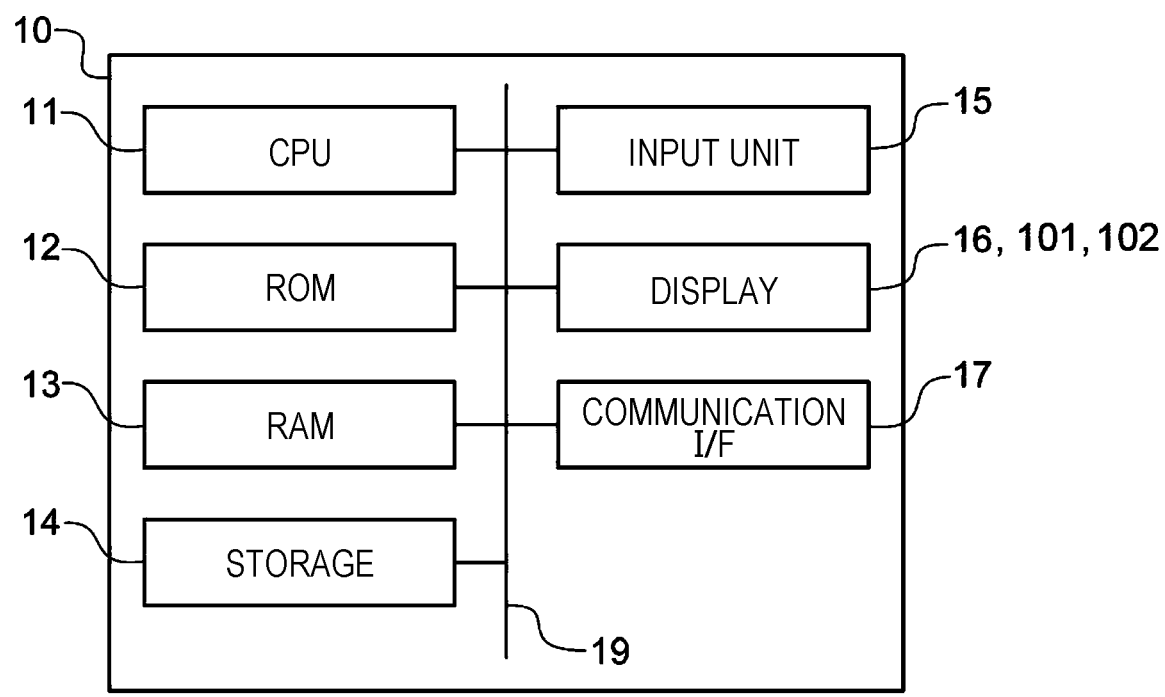
FIG. 3 is a block diagram illustrating an exemplary hardware configuration of the electronic device.

FIG. 3 is a block diagram illustrating the hardware configuration of the electronic device 10.

As illustrated in FIG. 3, the electronic device 10 includes a central processing unit (CPU) 11, read-only memory (ROM) 12, random-access memory (RAM) 13, a storage 14, an input unit 15, a display 16, and a communication interface (I/F) 17. These configurations are connected to be able to communicate with each other via a bus 19.

The CPU 11 is a central processing unit, and executes various programs and controls each unit. That is, the CPU 11 reads programs from the ROM 12 or the storage 14 and, using the RAM 13 as a work area, executes the programs. In accordance with the programs recorded in the ROM 12 or the storage 14, the CPU 11 controls each configuration described above and performs various types of arithmetic processing. In the present exemplary embodiment, the ROM 12 or the storage 14 stores a display control program for controlling display of the first display 101 and the second display 102.

The ROM 12 stores various programs and various data. Serving as a work area, the RAM 13 temporarily stores a program or data. The storage 14 includes storage devices such as a hard disk drive (HDD), a solid state drive (SSD), flash memory, and/or the like, and stores various programs including an operating system, and various data.

The input unit 15 includes a pointing device such as a mouse, and a keyboard, and is used to input various types of information.

The display 16 is, for example, a liquid crystal display, and displays various types of information. The display 16 may adopt a touchscreen system to function as the input unit 15. In the present exemplary embodiment, the display 16 corresponds to the first display 101 and the second display 102.

The communication interface 17 is an interface for communicating with other devices, and a standard such as Ethernet (registered trademark), Fiber Distributed Data Interface (FDDI), Wi-Fi (registered trademark), or the like is used.

When executing the above-mentioned display control program, the electronic device 10 realizes various functions using the above-described hardware resources.

Next, the functional configuration of the electronic device 10 will be described.

Figure 4:
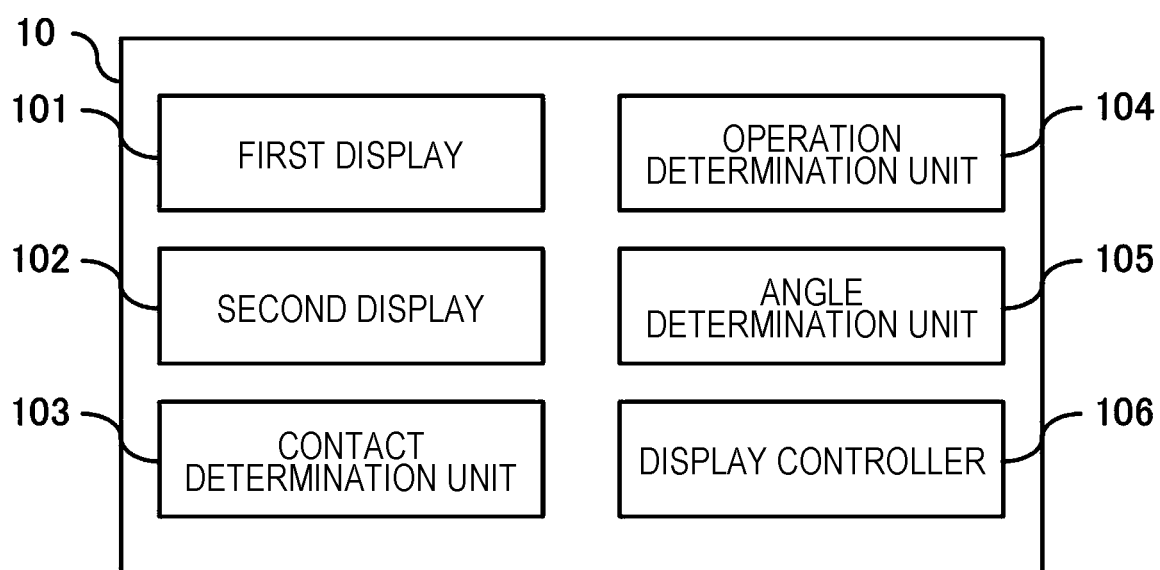
FIG. 4 is a block diagram illustrating an exemplary functional configuration of the electronic device.

FIG. 4 is a block diagram illustrating an exemplary functional configuration of the electronic device 10.

As illustrated in FIG. 4, the electronic device 10 includes, as the functional configuration, the first display 101, the second display 102, a contact determination unit 103, an operation determination unit 104, an angle determination unit 105, and a display controller 106. The contact determination unit 103, the operation determination unit 104, the angle determination unit 105, and the display controller 106 are realized by reading and executing, by the CPU 11, the display control program stored in the ROM 12 or the storage 14.

The first display 101 is, as described above, a display positioned outside when the electronic device 10 is folded by the folding portion 111. In addition, the second display 102 is, as described above, a display positioned inside when the electronic device 10 is folded by the folding portion 111.

The contact determination unit 103 determines whether there is a contact operation performed by the user on the first display 101 or the second display 102, and, if there is a contact operation, determines the contact point thereof. The contact determination unit 103 may simultaneously determine multiple contact points on the first display 101 or the second display 102.

The operation determination unit 104 determines, in the case where the contact determination unit 103 determines that there is a contact operation performed by the user on the first display 101 or the second display 102, the type of the contact operation. The type of a contact operation may be determined by various features of the contact operation. For example, the type of a contact operation may be determined by at least one of or a combination of contact time, contact intensity, number of contacts, presence or absence of contact point movement, contact point movement speed, and contact point movement distance of the contact operation. For example, the operation determination unit 104 detects a simple tap operation, two consecutive tap operations within a certain time (double tap operation), a long pressing operation (long touch operation), an operation with multiple contact points (multi-touch operation), a sliding operation in one direction while having a finger or the like on the display surface (swipe operation), and an operation of having a finger or the like on the display surface and moving it in various directions.

The angle determination unit 105 determines the folding angle of the electronic device 10 by the folding portion 111. It is assumed that the folding angle is 0 degrees when the electronic device 10 is folded as illustrated in FIG. 1, that is, the electronic device 10 is closed, and is 180 degrees when the electronic device 10 is horizontally opened. Although the range of the folding angle of the electronic device 10 according to the present exemplary embodiment is 0 degrees to 180 degrees, the range of the folding angle is not limited to this range. An electronic device according to the present disclosure may be folded in the opposite direction where the folding angle exceeds 180 degrees.

The display controller 106 performs display control on the first display 101 or the second display 102. For example, when the contact determination unit 103 determines that there is a contact operation on the first display 101 or the second display 102, the display controller 106 performs display control on at least one of the first display 101 and the second display 102 in accordance with the contact point and the type of the contact operation. The display controller 106 performs display control in accordance with the features of a contact operation performed by the user on the first display 101 or the second display 102. Furthermore, the display controller 106 perform display control on the basis of a change in the folding angle of the electronic device 10 by the folding portion 111, which is determined by the angle determination unit 105. Note that a change in the folding angle by the folding portion 111 includes both the case of an increase in the folding angle and the case of a decrease in the folding angle. Opening the electronic device 10 refers to an increase in the folding angle by the folding portion 111 from 0 degrees. Closing the electronic device 10 or folding the electronic device 10 refers to a decrease in the folding angle by the folding portion 111 to 0 degrees.

If a contact operation performed by the user is started earlier, either the completion timing of the contact operation performed by the user or the completion timing of a change in the folding angle by the folding portion 111 may be earlier. That is, the display controller 106 may perform display control in response to a change in the folding angle of the electronic device 10 by the folding portion 111 within a certain time after a contact operation performed by the user on the first display 101 or the second display 102 is completed. Alternatively, the display controller 106 may perform display control in the case where a change in the folding angle of the electronic device 10 by the folding portion 111 starts between the start and the end of a contact operation performed by the user on the first display 101 or the second display 102, and the change in the folding angle is completed after the contact operation is completed. Alternatively, the display controller 106 may perform display control in the case where a change in the folding angle of the electronic device 10 by the folding portion 111 starts and is completed between the start and the end of a contact operation performed by the user on the first display 101 or the second display 102.

The display controller 106 may perform display control of displaying the same application in different modes when performing display control on the first display 101 or the second display 102 in accordance with the contact point and the type of a contact operation. Alternatively, the display controller 106 may perform display control of displaying different applications when performing display control on the first display 101 or the second display 102 in accordance with the contact point and the type of a contact operation.

The case is conceivable in which, while information is being displayed on the first display 101, the folding angle of the electronic device 10 by the folding portion 111 exceeds a certain threshold greater than 0 degrees. That is, the case is conceivable in which, while information is being displayed on the first display 101, the user opens the electronic device 10. In this case, the display controller 106 may determine whether to keep the information displayed on the first display 101 according to the contact point and the type of a contact operation or according to a preconfigured setting.

The angle determination unit 105 may determine whether the folding angle by the folding portion 111 is a predetermined angle. The predetermined angle may be an angle at one point such as 90 degrees, 135 degrees, or the like, or a range such as 90 degrees or greater, 30 degrees to 60 degrees, or the like may be specified. The display controller 106 may detect a change in the folding angle by the folding portion 111 and perform display control differently depending on the folding angle by the folding portion 111 before or after the change. For example, the display controller 106 may perform display control differently depending on whether the folding angle before the change is the predetermined angle. Alternatively, the display controller 106 may perform display control differently depending on whether the folding angle by the folding portion 111 after the change is the predetermined angle. Alternatively, the display controller 106 may perform display control differently depending on whether the folding angle by the folding portion 111 before the change is a predetermined first angle, and the folding angle after the change is a predetermined second angle. In this case, the first angle and the second angle may be angles at one point, or ranges may be specified.

Specifically, it is assumed that the predetermined angle is 0 degrees to 30 degrees. In this case, if the folding angle by the folding portion 111 before the change is somewhere between 0 degrees to 30 degrees, the display controller 106 may perform display control of turning off the first display 101. Also, in this case, if the folding angle by the folding portion 111 before the change is other than 0 degrees to 30 degrees, the display controller 106 may perform display control of displaying, on the first display 101, all or some of the content displayed on the second display 102 before the folding angle changes. Some of the content displayed on the second display 102 may be content of high importance, or may be content selected by the user.

Alternatively, it is assumed that the predetermined angle is 0 degrees. In this case, if the folding angle by the folding portion 111 after the change is 0 degrees, the display controller 106 may perform display control of turning off the first display 101. Also, in this case, if the folding angle by the folding portion 111 after the change is an angle other than 0 degrees, the display controller 106 may perform display control of not turning off the first display 101.

The display controller 106 may perform display control on the first display 101 or the second display 102 differently between the case in which the folding angle by the folding portion 111 reaches an angle that is greater than or equal to 90 degrees and less than or equal to a certain first angle from a state in which the folding angle is greater than or equal to the first angle, and the case in which the folding angle reaches 0 degrees from a state in which the folding angle is an angle that is greater than or equal to 90 degrees and less than or equal to the first angle. For example, it is assumed that the first angle is 135 degrees. The display controller 106 may perform display control on the first display 101 or the second display 102 differently between the state in which the folding angle of the electronic device 10 by the folding portion 111 reaches 120 degrees from 180 degrees, and the state in which the folding angle reaches 0 degrees from 120 degrees.

When performing display control on the first display 101 or the second display 102, the display controller 106 may perform display control in accordance with the operating mode of the electronic device 10. The operating mode of the electronic device 10 may be an operating mode that defines the power consuming speed of a battery (not illustrated). That is, the display controller 106 may perform display control differently between the operating mode in which the electronic device 10 is operated while increasing the power consuming speed of the battery, and the operating mode in which the electronic device 10 is operated while decreasing the power consuming speed of the battery.

When performing display control on the first display 101 or the second display 102, the display controller 106 may perform display control in accordance with the internal state of the electronic device 10. For example, the internal state of the electronic device 10 may be the state of charge (SoC) of a battery (not illustrated), and display control may be performed in accordance with SoC. That is, the display controller 106 may perform display control differently between the case in which SoC is greater than or equal to a certain threshold and the case in which SoC is less than the threshold. Multiple thresholds may be set for SoC.

That is, the display controller 106 performs not only display control simply in accordance with a contact operation on the first display 101 or the second display 102, but also display control on the basis of a change in the folding angle of the electronic device 10. Since the display controller 106 performs display control on the basis of a change in the folding angle of the electronic device 10, the electronic device 10 may provide various types of display and usage methods to the user.

Next, the operation of the electronic device 10 will be described.

Figure 5:
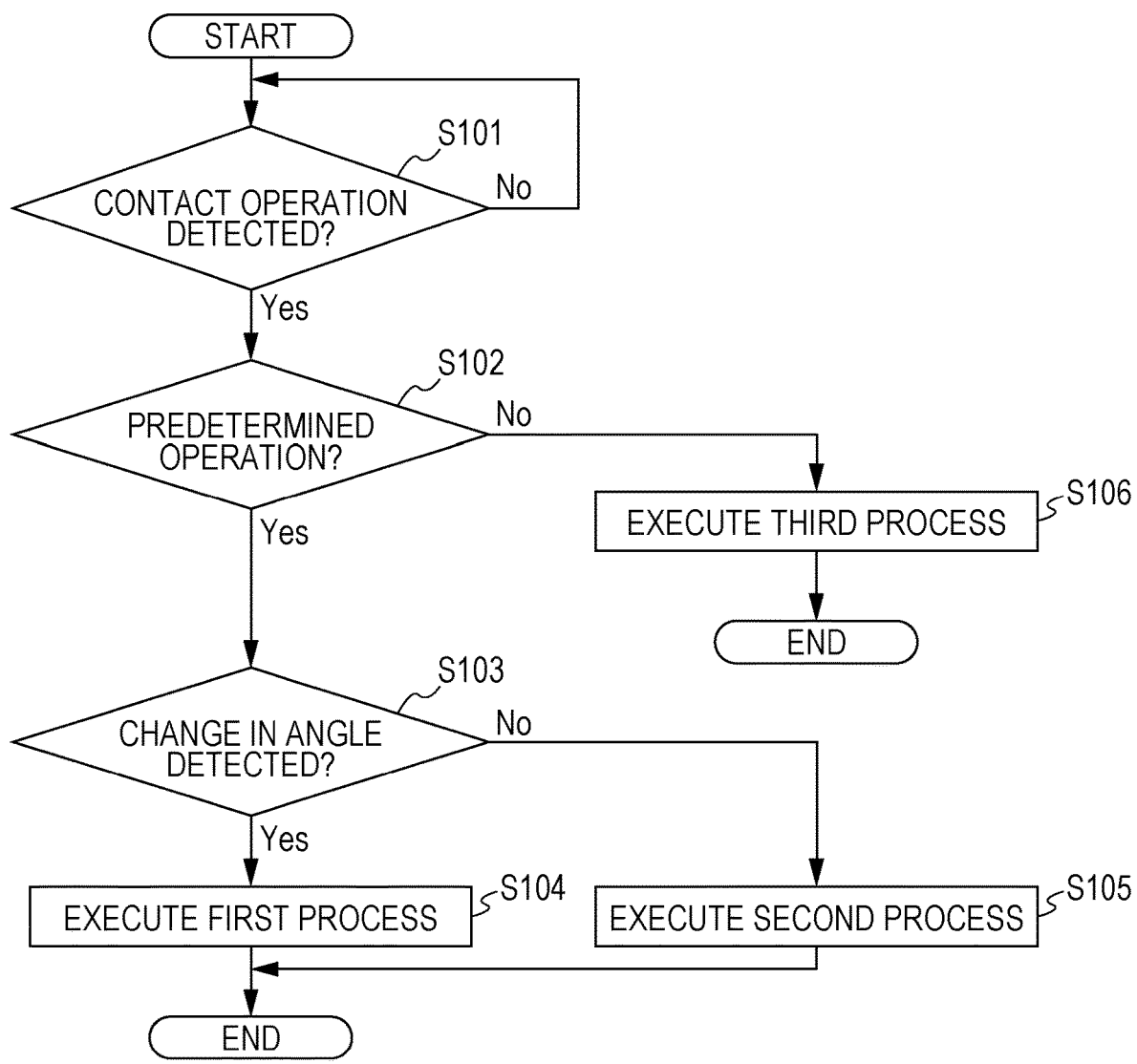
FIG. 5 is a flowchart illustrating the flow of a display control process performed by the electronic device.

FIG. 5 is a flowchart illustrating the flow of a display control process performed by the electronic device 10. The display control process is performed by the CPU 11 by reading the display control program from the ROM 12 or the storage 14, expanding the program in the RAM 13, and executing the program.

The display control process illustrated in FIG. 5 is an example of a display control process performed by the CPU 11 on the first display 101 or the second display 102 in accordance with a contact operation on the first display 101 or the second display 102. The CPU 11 waits until there is a contact operation on the first display 101 or the second display 102 (step S101).

In response to detection of a contact operation on the first display 101 or the second display 102 (YES in step S101), the CPU 11 determines whether a predetermined operation is performed on the first display 101 or the second display 102 (step S102). The predetermined operation is an operation for performing, by the CPU 11, display control on the first display 101 or the second display 102 in accordance with the contact point and the type of a contact operation.

In response to determination that the predetermined operation is performed on the first display 101 or the second display 102 (YES in step S102), the CPU 11 determines whether a change in the folding angle of the electronic device 10 by the folding portion 111 is detected after the contact operation (step S103). The CPU 11 may determine whether a change in the folding angle of the electronic device 10 by the folding portion 111 is detected within a certain time after a contact operation is performed.

In response to detection of a change in the folding angle of the electronic device 10 by the folding portion 111 after a contact operation is performed (YES in step S103), the CPU 11 performs a display control process on the first display 101 or the second display 102 that is involved in detection of a change in the folding angle (step S104). Display control in this step S104 is referred to as a "first process".

In response to no detection of a change in the folding angle of the electronic device 10 by the folding portion 111 after a contact operation is performed (NO in step S103), the CPU 11 performs a display control process on the first display 101 or the second display 102 that is involved in no detection of a change in the folding angle (step S105). Display control in this step S105 is referred to as a "second process".

In response to determination that the predetermined operation is not performed on the first display 101 or the second display 102 (NO in step S102), the CPU 11 performs a display control process on the first display 101 or the second display 102 in accordance with an operation that is performed on the first display 101 or the second display 102 and that is not the predetermined operation (step S106). Display control in this step S106 is referred to as a "third process".

In this manner, the CPU 11 changes the content of the display control process on the first display 101 or the second display 102 in accordance with the features of a contact operation and a change in the folding angle of the electronic device 10. That is, the CPU 11 executes the display control process on the first display 101 or the second display 102 by selecting one from at least three processes. Since the CPU 11 changes the display control process on the first display 101 or the second display 102, the electronic device 10 may provide various types of display and usage methods to the user.

Next, specific examples of the display control process performed by the CPU 11 will be described while describing examples of information displayed on the first display 101 and the second display 102.

Figure 6:
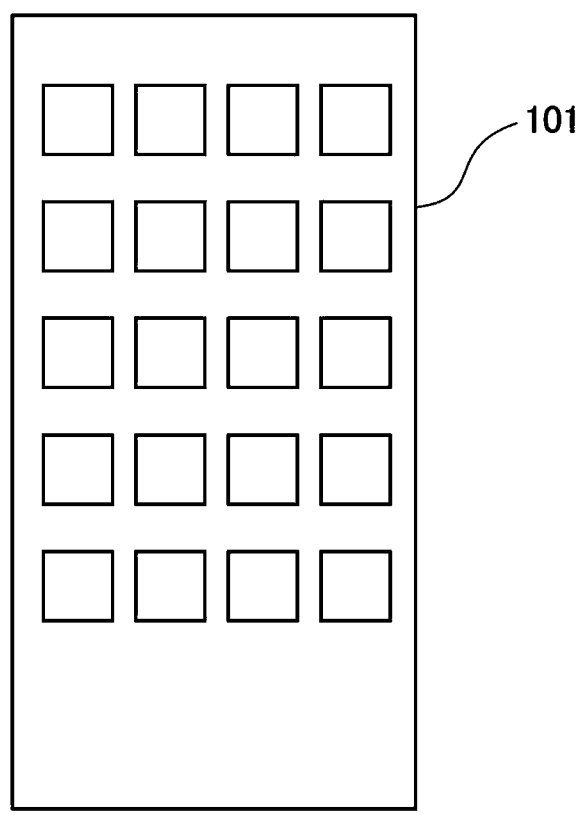
FIG. 6 is a diagram illustrating a display example.
Figure 7:
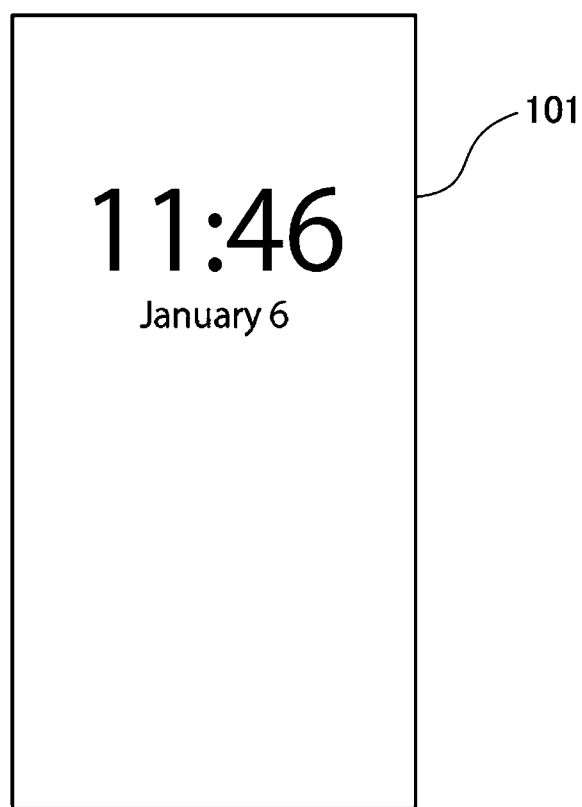
FIG. 7 is a diagram illustrating a display example.

FIGS. 6 and 7 are diagrams each illustrating an example of information displayed on the first display 101. FIG. 6 illustrates a screen on which the first display 101 displays a plurality of icons. A screen illustrating multiple icons, illustrated in FIG. 6, will be referred to as a home screen. In addition, FIG. 7 illustrates a screen on which the first display 101 displays the current time and the current date. A screen illustrating the current time and the current date, illustrated in FIG. 7, will be referred to as a standby screen. These screens are displayed when, for example, the electronic device 10 recovers from the sleep state or when an application running on the electronic device 10 is terminated.

Figure 8:
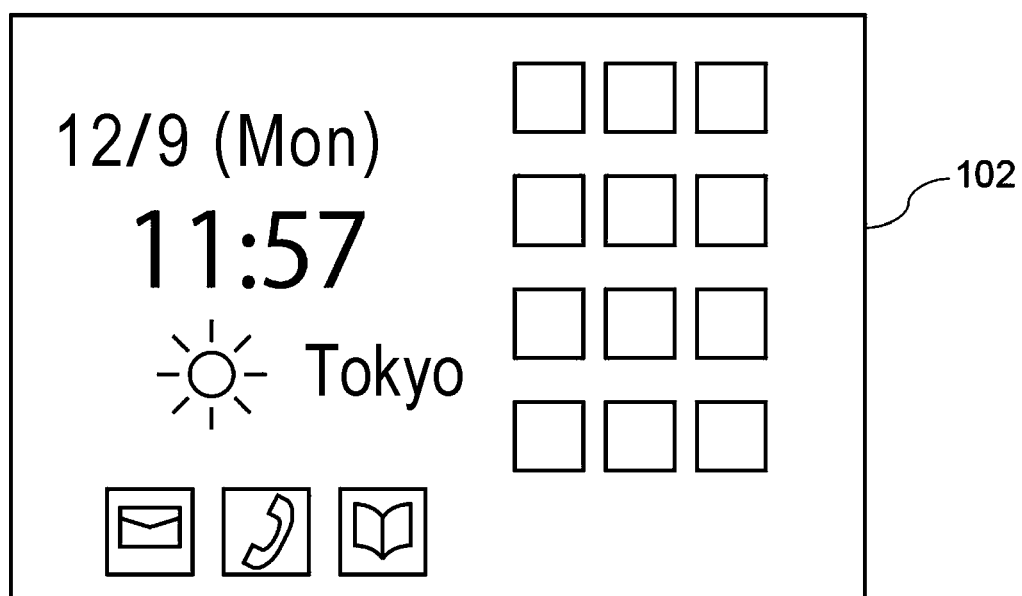
FIG. 8 is a diagram illustrating a display example.

FIG. 8 is a diagram illustrating an example of information displayed on the second display 102. FIG. 8 illustrates a screen on which the current time, the current date, and the weather at the current location are displayed on the left half of the second display 102, and multiple icons are displayed on the right half. The screen illustrated in FIG. 8 is displayed when the electronic device 10 recovers from the sleep state or when the folding angle of the electronic device 10 becomes a certain angle or greater, such as 90 degrees or greater.

The case will be conceived in which, while the screen as illustrated in FIG. 8 is being displayed, the user performs a long touch operation on the background, which serves as a predetermined operation, and the electronic device 10 is folded within a certain time after the long touch operation is completed. In this case, the CPU 11 performs display control of displaying the home screen illustrated in FIG. 6 on the first display 101, which serves as the first process illustrated in FIG. 5. Also, in this case, the CPU 11 may change the color or the brightness of the home screen in accordance with the long touch operation, which serves as the second process illustrated in FIG. 5. By changing the color or the brightness of the home screen in accordance with the long touch operation, the home screen appears to the user to have been selected. In contrast, when the user performs a tap operation on an icon, which serves as an operation that is not a predetermined operation, the CPU 11 executes a process of activating the application of the tapped icon, which serves as the third process illustrated in FIG. 5.

In the case where somewhere on the home screen whose color or brightness has been changed is tapped by the user, or in the case where a certain time has elapsed, the CPU 11 may restore the color or the brightness. By restoring the color or the brightness, the home screen appears to the user to have been deselected. When the electronic device 10 is folded while the home screen is being selected, the CPU 11 displays the home screen on the first display 101. When the electronic device 10 is folded while the home screen is not being selected, the CPU 11 displays the standby screen on the first display 101.

Various applications are installed in the electronic device 10. By performing a contact operation on the first display 101 and the second display 102, the user may activate the installed applications, operate the activated applications, and terminate the applications. Hereinafter, display control performed by the CPU 11 on the first display 101 and the second display 102 will be described by illustrating various applications.

FIG. 9 is a diagram illustrating an example of information displayed on the second display 102. FIG. 9 illustrates a state in which an e-mail application is displayed on the second display 102. When the user selects a reception list on the left side, the CPU 11 displays the text of a selected e-mail on the right side. FIG. 9 illustrates a state in which the user has selected an e-mail sent by Sato.

FIG. 10 is a diagram illustrating an example of information displayed on the second display 102. FIG. 10 illustrates a state in which the e-mail application is displayed on the second display 102. FIG. 10 illustrates a state in which the user has selected an e-mail sent by Suzuki.

Display control performed by the CPU 11 on the first display 101 and the second display 102 in the case where the user switches the to-be-selected e-mail, as illustrated in the transition from FIG. 9 to FIG. 10, will be described. For example, it is assumed that the user closes the electronic device 10 within a certain time such as 5 seconds after selecting an e-mail sent by Suzuki with a contact operation on the second display 102. A predetermined contact operation here may be, for example, a tap operation or a long-touch operation on a list. That is, it is assumed that the folding angle of the electronic device 10 becomes 0 degrees within a certain time after the user selects an e-mail sent by Suzuki. In this case, the CPU 11 may perform display control on the first display 101 to display the text of an e-mail sent by Suzuki, which is selected before the electronic device 10 is closed, as illustrated in FIG. 11.

In contrast, it is assumed that the user selects an e-mail sent by Suzuki with a contact operation on the second display 102, and, after the elapse of a certain time such as five seconds, the user closes the electronic device 10. That is, it is assumed that the user selects an e-mail sent by Suzuki, and, after the elapse of a certain time, the folding angle of the electronic device 10 becomes 0 degrees. In this case, the CPU 11 may execute display control on the first display 101 to display a list of received e-mails, as illustrated in FIG. 12.

Figure 11:
FIG. 11 is a diagram illustrating a display example.
Figure 12:
FIG. 12 is a diagram illustrating a display example.

The CPU 11 may determine in which of the states illustrated in FIGS. 11 and 12 the first display 101 is displayed, depending on the case in which the user simply taps an e-mail sent by Suzuki and the case in which the user long-touches an e-mail sent by Suzuki. That is, even in the same state, a plurality of predetermined operations may be set for the electronic device 10.

Figure 13:
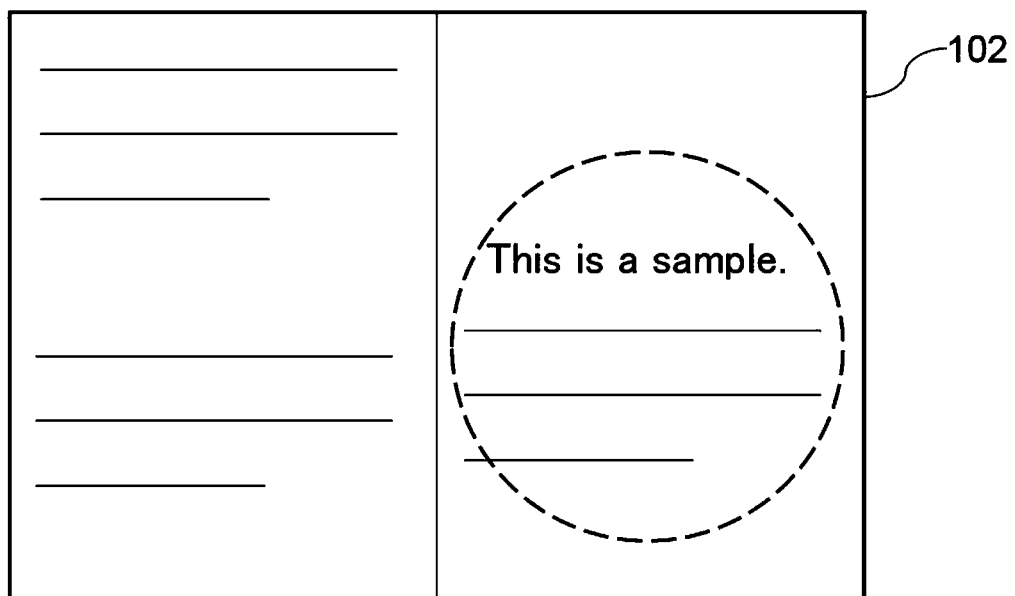
FIG. 13 is a diagram illustrating a display example.

FIG. 13 is a diagram illustrating an example of information displayed on the second display 102. FIG. 13 illustrates a state in which an e-book reader application is displayed on the second display 102.

Figure 14:
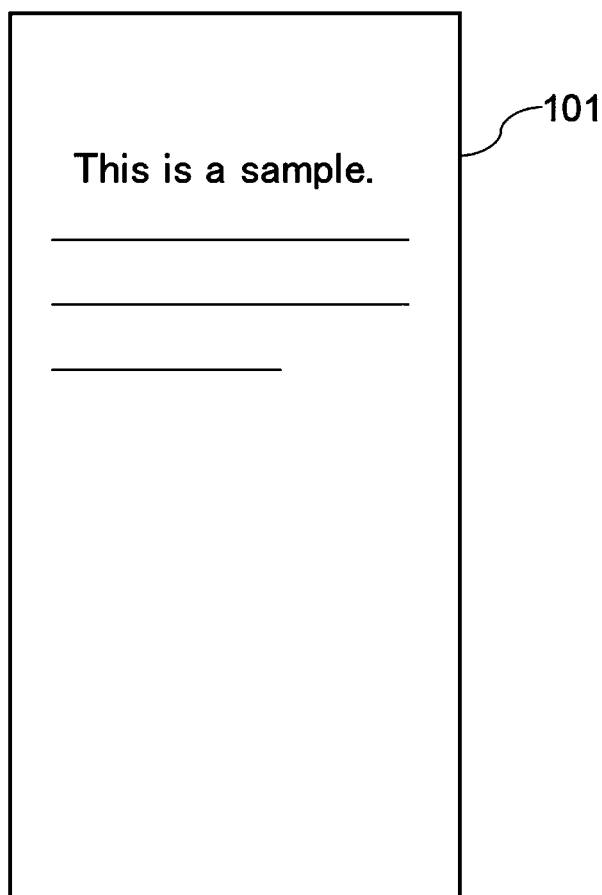
FIG. 14 is a diagram illustrating a display example.

It is assumed that, as a predetermined contact operation on the second display 102, the user selects a portion of the content of an e-book displayed by the e-book reader, and, within a certain time such as five second, the user closes the electronic device 10. The user's operation of selecting a portion of the content is, for example, an operation of dragging a finger from the start point to the end point, an operation of surrounding a portion with a finger, and so forth. In this case, the CPU 11 may perform display control on the first display 101 to display the content of the e-book on the basis of a portion selected before the user closes the electronic device 11, as illustrated in FIG. 14.

Figure 15:
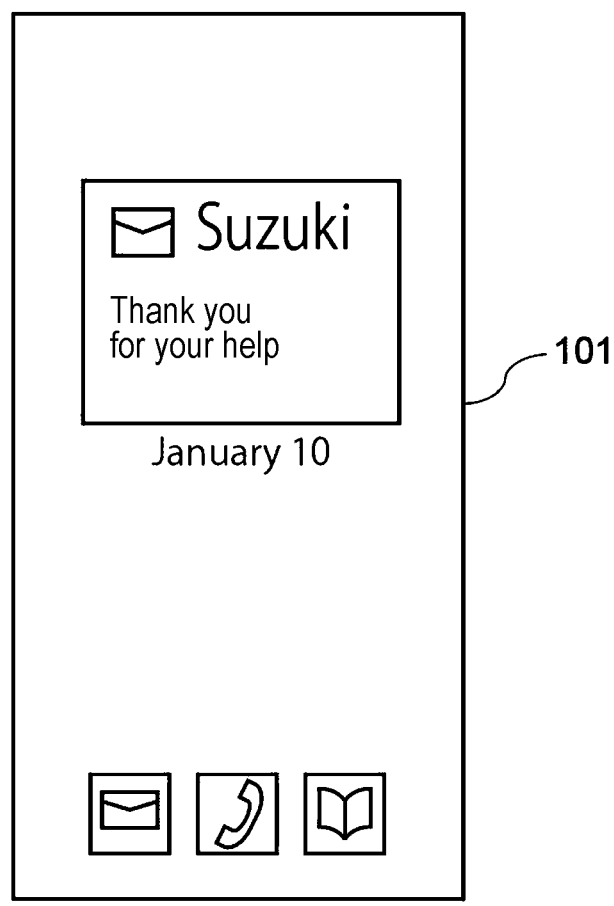
FIG. 15 is a diagram illustrating a display example.

FIG. 15 is a diagram illustrating an example of information displayed on the first display 101. FIG. 15 illustrates a state in which, while the CPU 11 is displaying the standby screen on the first display 101, a notification indicating receipt of an e-mail is superimposed and displayed on the standby screen. It is assumed that the e-book reader application is displayed on the second display 102 immediately before the standby screen illustrated in FIG. 15 is displayed.

Figure 16:
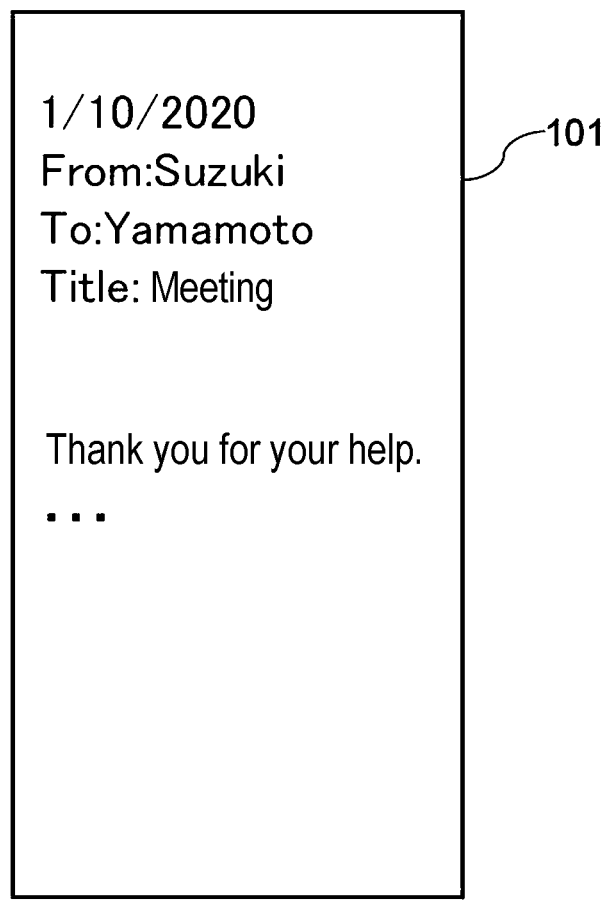
FIG. 16 is a diagram illustrating a display example.

When the user simply selects the notification in the state illustrated in FIG. 15, the CPU 11 executes display control of displaying the content of the received e-mail on the first display 101, as illustrated in FIG. 16.

Figure 17:
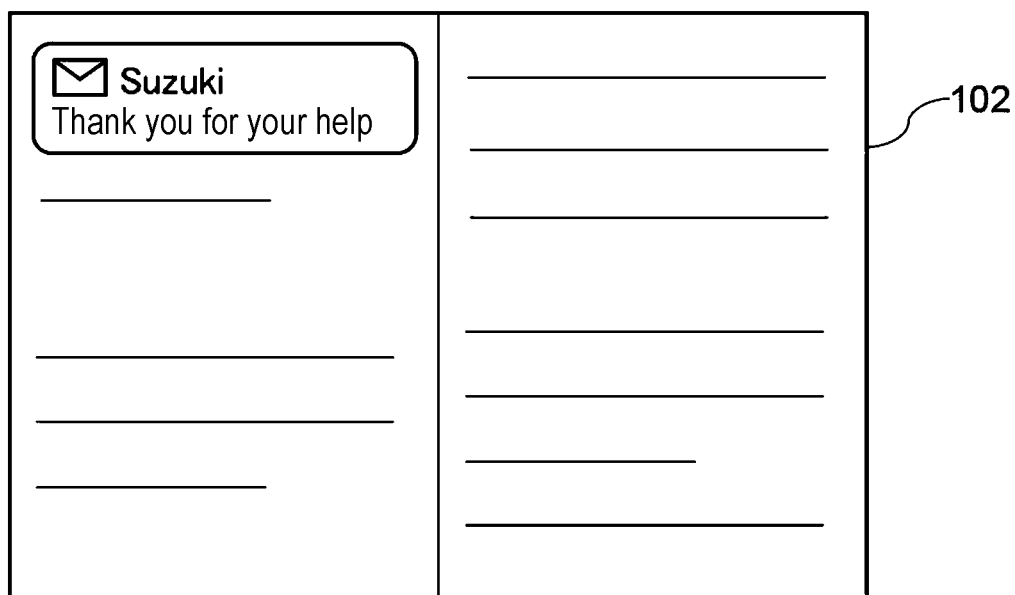
FIG. 17 is a diagram illustrating a display example.

In contrast, it is assumed that the user opens the electronic device 10 without selecting the notification. That is, it is assumed that the folding angle of the electronic device 10 becomes an angle greater than 0 degrees, such as 180 degrees. In this case, the CPU 11 displays the e-book reader application on the second display 102, and then executes display control of superimposing and displaying the notification indicating receipt of an e-mail on the e-book reader, as illustrated in FIG. 17.

Figure 18:
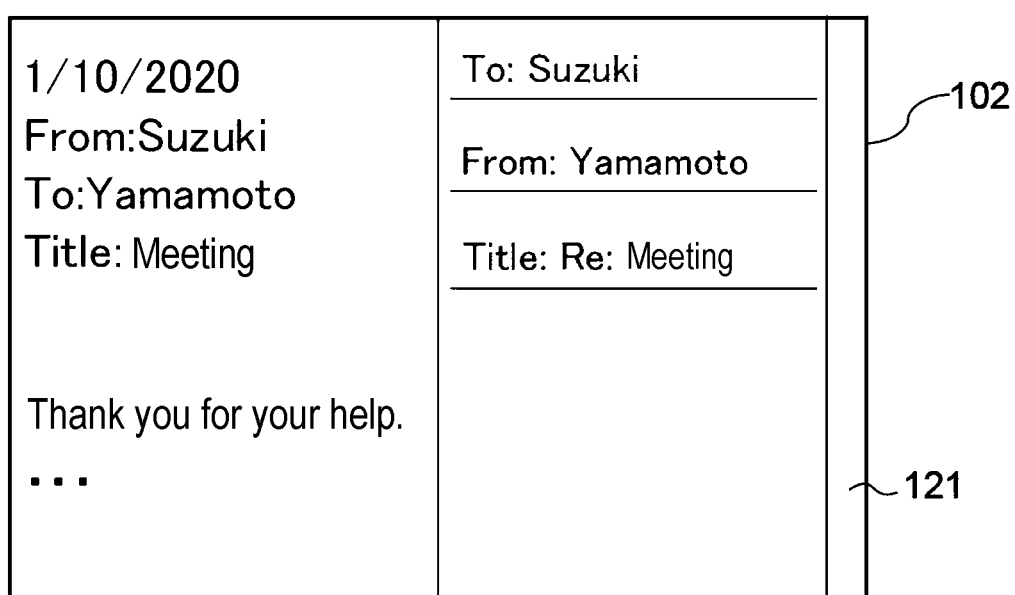
FIG. 18 is a diagram illustrating a display example.

It is assumed that, while the content of the received e-mail is being displayed on the first display 101, as illustrated in FIG. 16, the user opens the electronic device 10. That is, it is assumed that the folding angle of the electronic device 10 becomes an angle greater than 0 degrees, such as 180 degrees. In this case, the CPU 11 may execute display control of displaying the content of the received e-mail and an e-mail reply screen on the second display 102, as illustrated in FIG. 18. Furthermore, the CPU 11 performs display control of displaying a tab 121 for calling the e-book reader application, which was most recently displayed on the second display 102, on the second display 102, as illustrated in FIG. 18. Note that the CPU 11 may perform display control of displaying, besides the tab 121, an icon for calling an application that was most recently displayed on the second display 102 on the second display 102.

In FIG. 18, the text of an e-mail received from Suzuki is displayed on the second display 102. In this state, it is assumed that the user performs, with a contact operation on the second display 102, a swipe operation of swiping the text portion of the e-mail from left to right. In this case, the CPU 11 may perform display control on the second display 102 to display a list of e-mails received from Suzuki on the left side and the text of the most recent e-mail received from Suzuki on the right side, as illustrated in FIG. 19.

Figure 20:
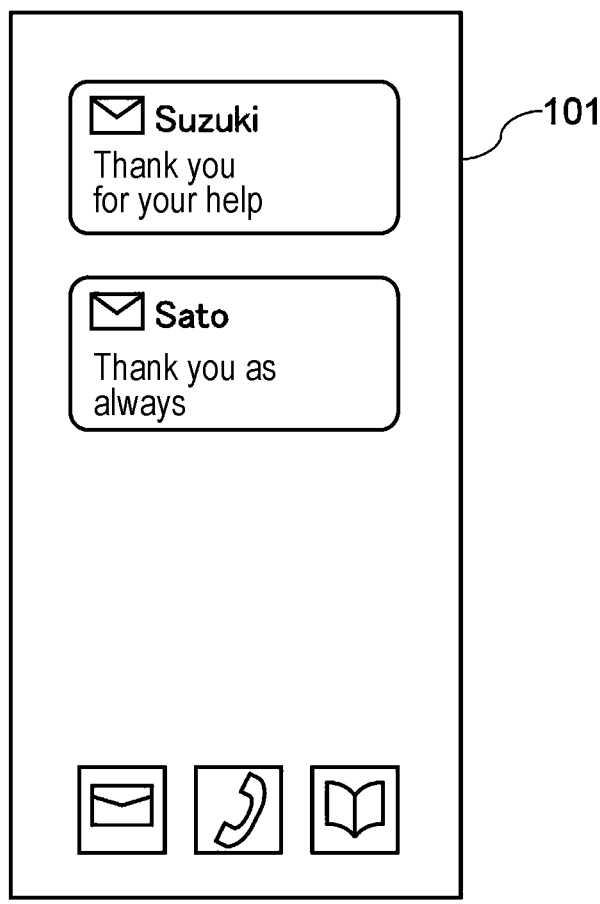
FIG. 20 is a diagram illustrating a display example.

The CPU 11 may sometimes display a plurality of notifications on the first display 101 or the second display 102. FIG. 20 is a diagram illustrating an example of information displayed on the first display 101. FIG. 20 illustrates a state in which, while the CPU 11 is displaying the standby screen on the first display 101, a plurality of notifications each indicating receipt of an e-mail are superimposed and displayed on the standby screen.

In addition, the CPU 11 may execute display control on the first display 101 to display a list of received e-mails, as illustrated in FIG. 21.

When the user selects a notification indicating receipt of an e-mail from Suzuki in the state illustrated in FIG. 20, the CPU 11 executes display control of displaying the content of the e-mail received from Suzuki on the first display 101, as illustrated in FIG. 16. Similarly, when the user selects an e-mail from Suzuki from the list displayed on the first display 101 in the state illustrated in FIG. 21, the CPU 11 executes display control of displaying the content of the e-mail received from Suzuki on the first display 101, as illustrated in FIG. 16.

It is assumed that the user opens the electronic device 10 while the content of the received e-mail, illustrated in FIG. 16, is being displayed on the first display 101. That is, it is assumed that the folding angle of the electronic device 10 becomes an angle greater than 0 degrees, such as 180 degrees. In this case, the CPU 11 may perform display control of displaying a list of e-mails received from Suzuki on the left side of the second display 102 and the text of the most recent e-mail received from Suzuki on the right side of the second display 102, as illustrated in FIG. 19. Although a tab or an icon for calling the most recently displayed application is not illustrated in FIG. 19, the CPU 11 may display the tab or the icon on the second display 102.

Figure 22:
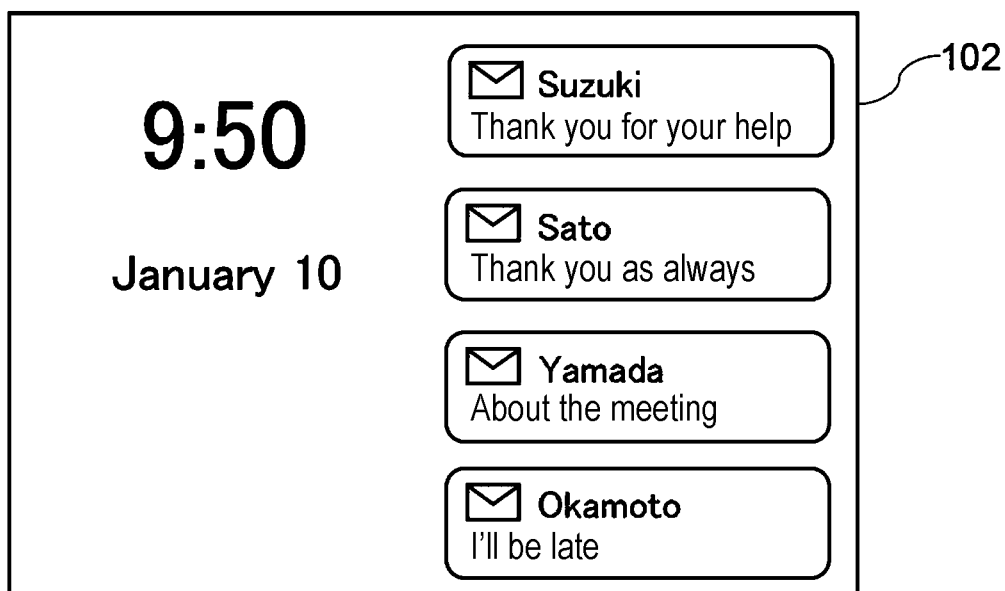
FIG. 22 is a diagram illustrating a display example.

When the user opens the electronic device 10 while the first display 101 is displaying a plurality of notifications as illustrated in FIG. 20, the CPU 11 may perform display control on the second display 102 to superimpose the plurality of notifications each indicating receipt of an e-mail on the standby screen. That is, when the folding angle by the folding portion 111 changes from 0 degrees to 180 degrees, the CPU 11 may perform display control on the second display 102 to superimpose the plurality of notifications each indicating receipt of an e-mail on the standby screen. FIG. 22 is a diagram illustrating an example of information displayed on the second display 102. FIG. 22 illustrates a state in which, while the CPU 11 is displaying the standby screen on the second display 102, the plurality of notifications each indicating receipt of an e-mail are superimposed and displayed on the standby screen.

The CPU 11 may change content of the display control, in accordance with the features of a contact operation on the first display 101 or the second display 102.

Figure 23:
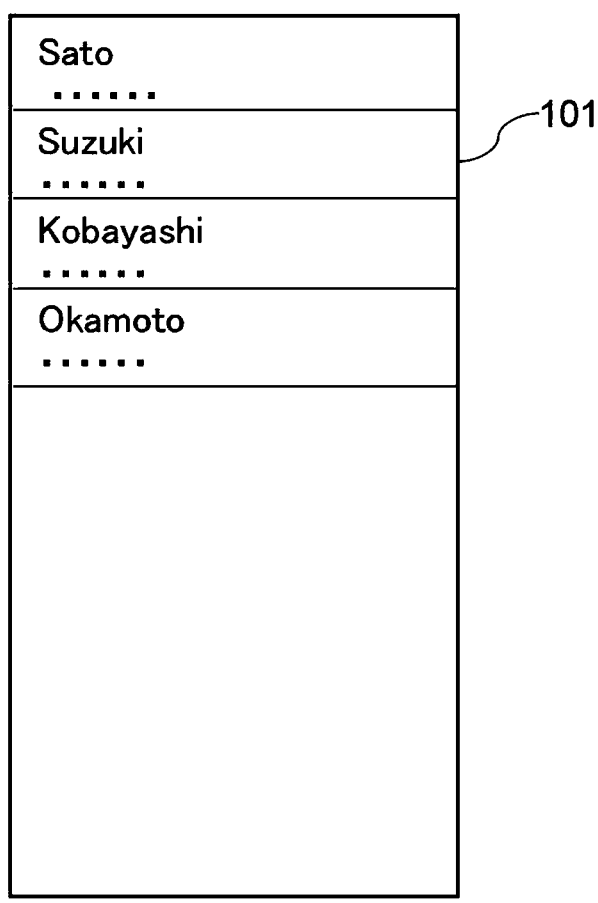
FIG. 23 is a diagram illustrating a display example.

FIG. 23 is a diagram illustrating an example of information displayed on the first display 101. For example, it is assumed that the CPU 11 executes display control of displaying a list of e-mails received by the electronic device 10 on the first display 101 on the basis of an operation performed by the user, as illustrated in FIG. 23.

Figure 24:
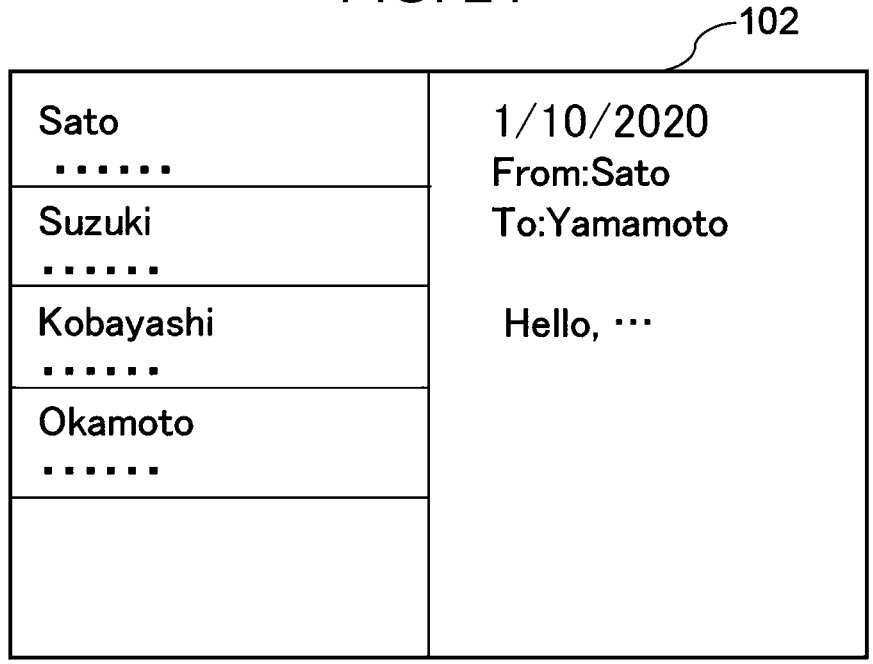
FIG. 24 is a diagram illustrating a display example.

In this state, it is assumed that the user opens the electronic device 10 without performing any contact operation on the first display 101. That is, it is assumed that the folding angle changes from 0 degrees to 180 degrees without having the user perform any contact operation on the first display 101. In this case, the CPU 11 may perform display control of displaying a list of received e-mails on the left side of the second display 102 and the text of an e-mail received from Sato, which is at the beginning of the list, on the right side of the second display 102, as illustrated in FIG. 24.

Figure 25:
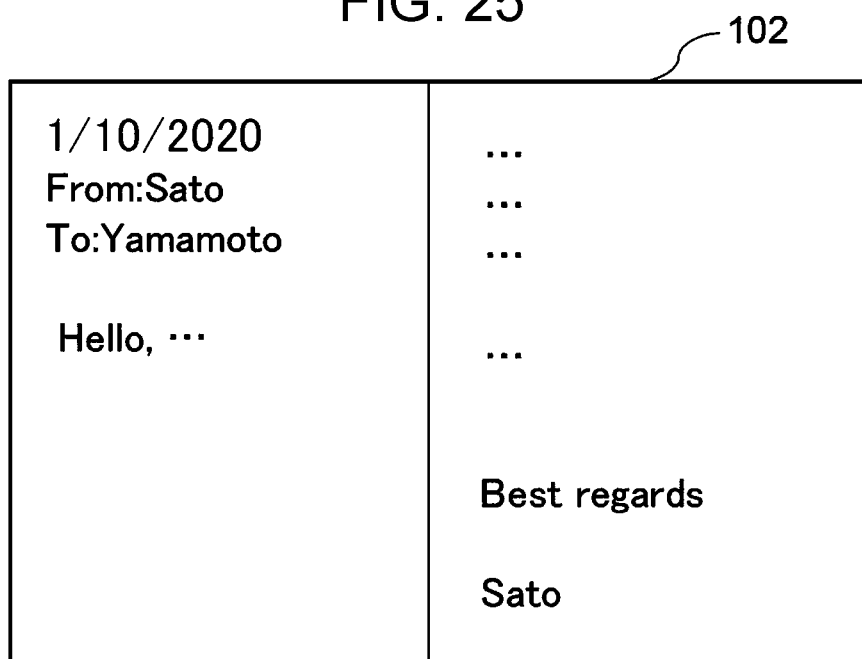
FIG. 25 is a diagram illustrating a display example.

In contrast, it is assumed that the user opens the electronic device 10 after performing a contact operation of long-touching one of the emails in the list on the first display 101. In this case, the CPU 11 may perform display control of displaying the text of the selected e-mail on the entire second display 102, as illustrated in FIG. 25.

Alternatively, it is assumed that the user performs a contact operation of long-touching one of the e-mails in the list on the first display 101, and keeps the electronic device 10 closed. In this case, the CPU 11 may perform display control of displaying the text of the selected e-mail on the first display 101.

Figure 26:
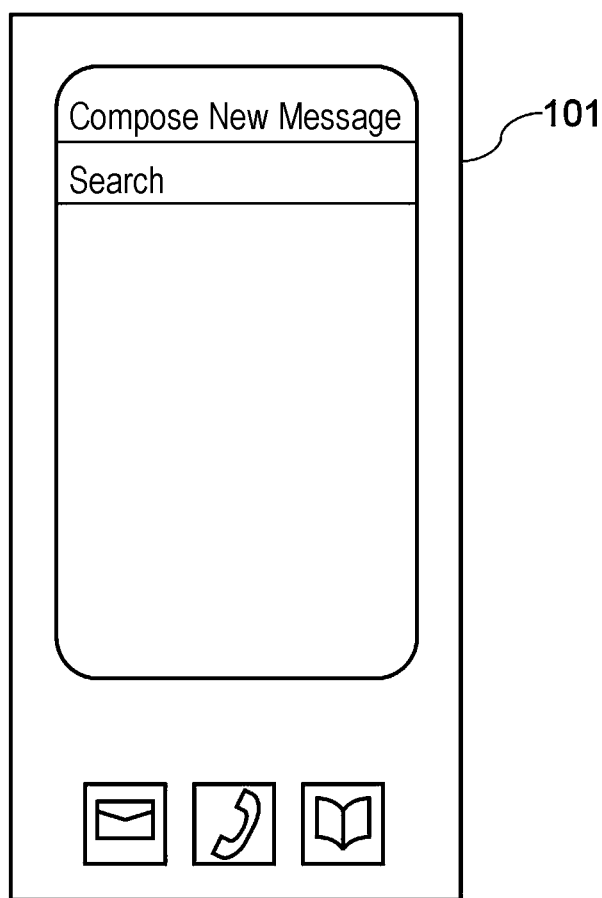
FIG. 26 is a diagram illustrating a display example.

FIG. 26 is a diagram illustrating an example of information displayed on the first display 101. For example, it is assumed that the CPU 11 executes display control of displaying a user interface for receiving an operation regarding e-mails on the first display 101 on the basis of an operation performed by the user, as illustrated in FIG. 26.

Figure 27:
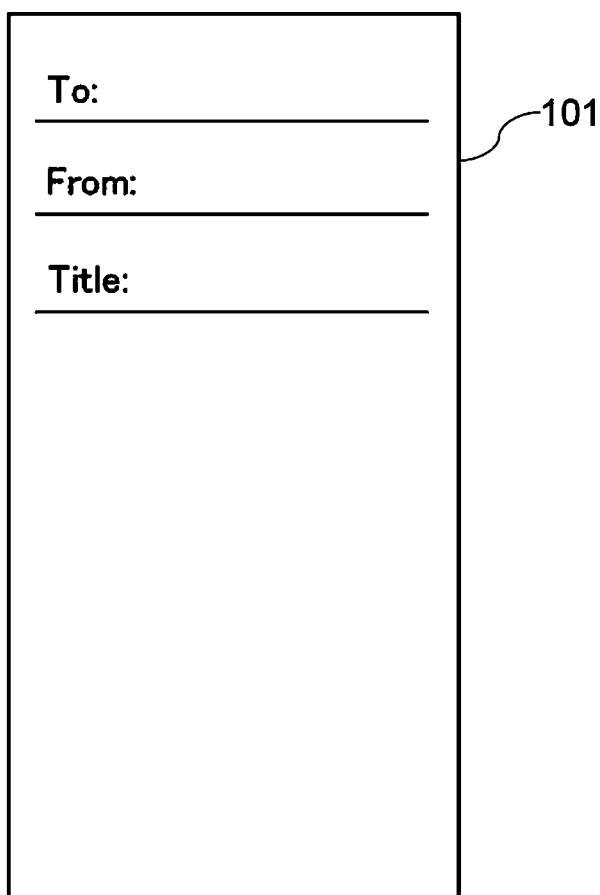
FIG. 27 is a diagram illustrating a display example.

In the state illustrated in FIG. 26, it is assumed that the user taps "new message" and keeps the electronic device 10 closed. That is, it is assumed that the folding angle remains unchanged from 0 degrees after the user taps "new message". In this case, the CPU 11 may execute display control of displaying a user interface for newly composing an e-mail on the first display 101, as illustrated in FIG. 27.

Figure 28:
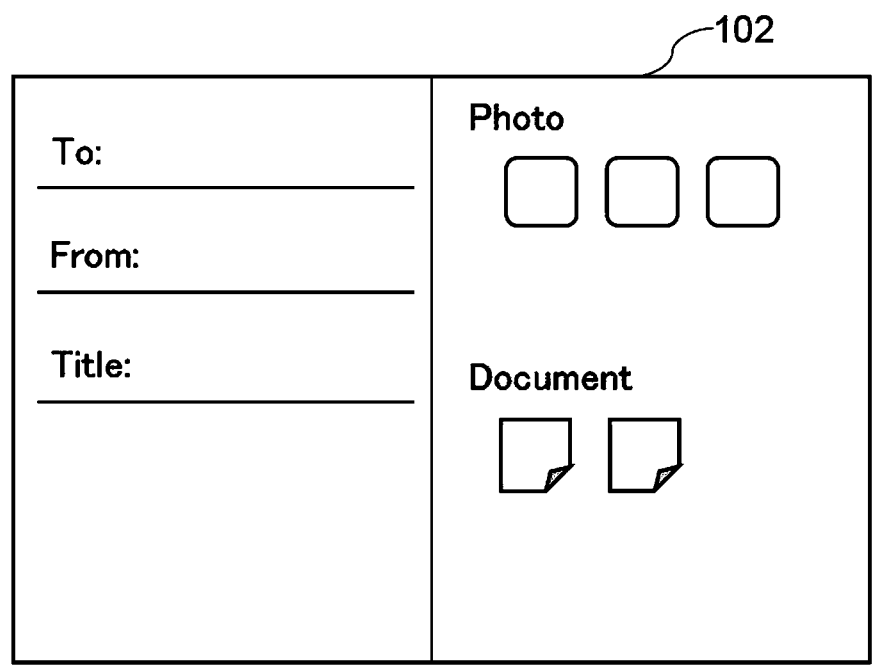
FIG. 28 is a diagram illustrating a display example.

Alternatively, in the state illustrated in FIG. 26, it is assumed that the user opens the electronic device 10 after performing a contact operation of long-touching "new message". In this case, the CPU 11 may execute display control of displaying a user interface for newly composing an e-mail on the left side of the second display 102, and displaying a user interface for selecting a photo or a document to be attached to the e-mail on the right side of the second display 102, as illustrated in FIG. 28. If the cursor is at the e-mail recipient ("To" field) in the interface illustrated in FIG. 28, the CPU 11 may execute display control of displaying an address book saved in the electronic device 10 or a server (not illustrated) on the right side of the second display 102.

In the state illustrated in FIG. 26, it is assumed that the user taps "search" and keeps the electronic device 10 closed. In this case, the CPU 11 may execute display control of displaying a user interface for searching for e-mails on the first display 101, as illustrated in FIG. 29.

Figure 29:
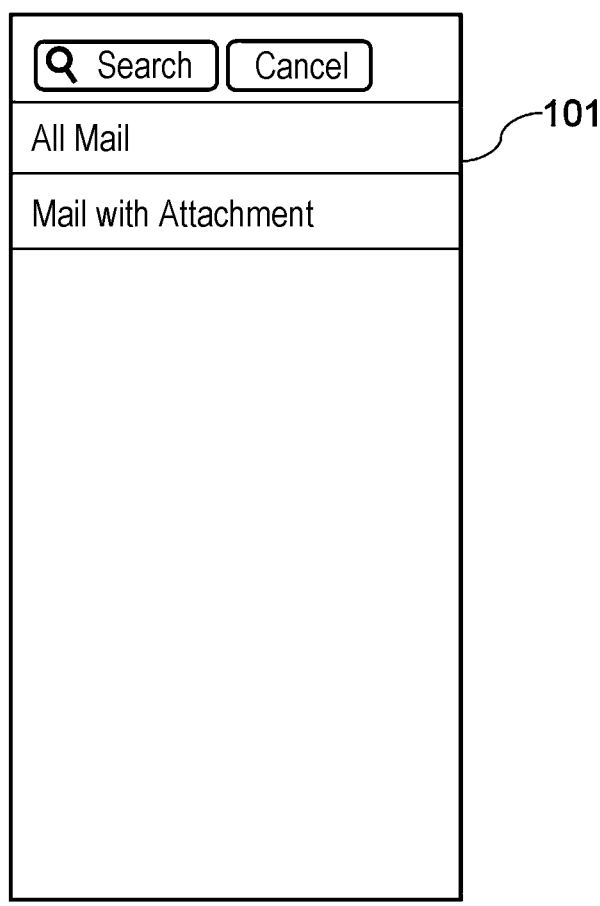
FIG. 29 is a diagram illustrating a display example.
Figure 30:
FIG. 30 is a diagram illustrating a display example.

When the user enters, for example, "Sato" in the search box of the user interface illustrated in FIG. 29, the CPU 11 executes display control of displaying a list of e-mails that include "Sato" in the sender on the first display 101, as illustrated in FIG. 30.

Here, it is assumed that the user opens the electronic device 10 after performing a contact operation of long-touching "Sato Hanako" from a list of e-mails that include "Sato" in the sender. In this case, the CPU 11 may perform display control of displaying a list of e-mails received from "Sato Hanako" on the left side of the second display 102, and displaying the text of an e-mail received from "Sato Hanako", which is at the beginning of the list, on the right side of the second display 102, as illustrated in FIG. 31.

In contrast, it is assumed that the user opens the electronic device 10 without performing any contact operation on the first display 101 from the state illustrated in FIG. 30. In this case, the CPU 11 may perform display control of displaying a list of e-mails that include "Sato" in the sender on the left side of the second display 102, and displaying the text of an e-mail at the beginning of the list on the right side of the second display 102, as illustrated in FIG. 32.

Figure 33:
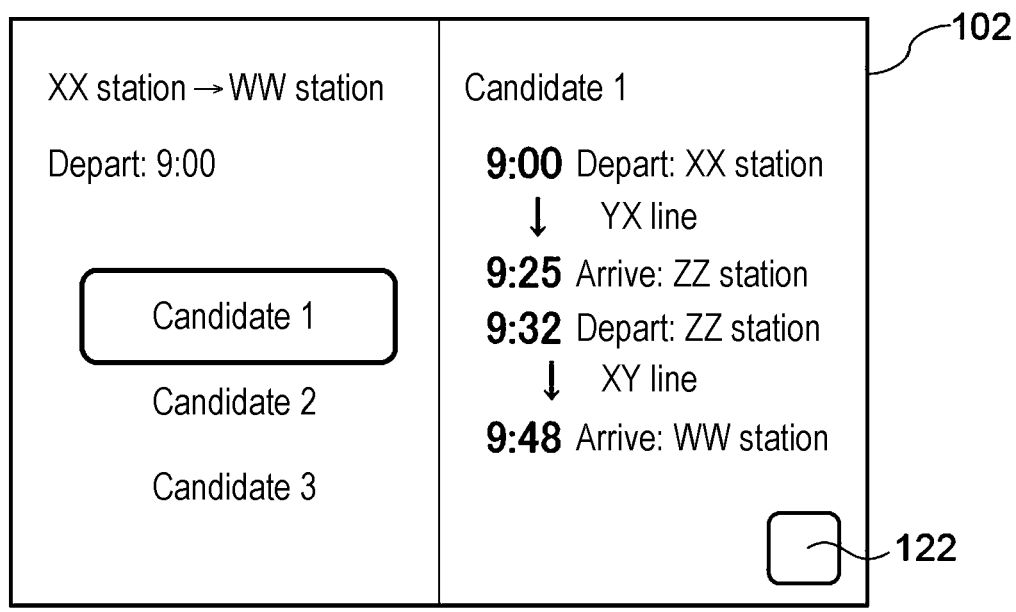
FIG. 33 is a diagram illustrating a display example.

An example in which the CPU 11 performs display control for another application will be discussed. FIG. 33 is a diagram illustrating an example of information displayed on the second display 102. What is illustrated in FIG. 33 is an example in which a transfer guidance application for presenting train transfer guidance is displayed on the second display 102. For example, it is assumed that the CPU 11 performs display control of displaying candidates for transfer from the departure station to the arrival station on the left side of the second display 102, and displaying the details of a selected candidate on the right side of the second display 102. In addition, FIG. 33 illustrates a state in which a button 122 for displaying, on the first display 101, the details of the transfer guidance application displayed on the second display 102 is displayed on the second display 102.

In this state, it is assumed that the user closes the electronic device 10 after tapping the button 122 displayed on the second display 102. The CPU 11 may perform display control of displaying the candidate for transfer from the departure station to the arrival station on the first display 101, as illustrated in FIG. 34.

Figure 34:
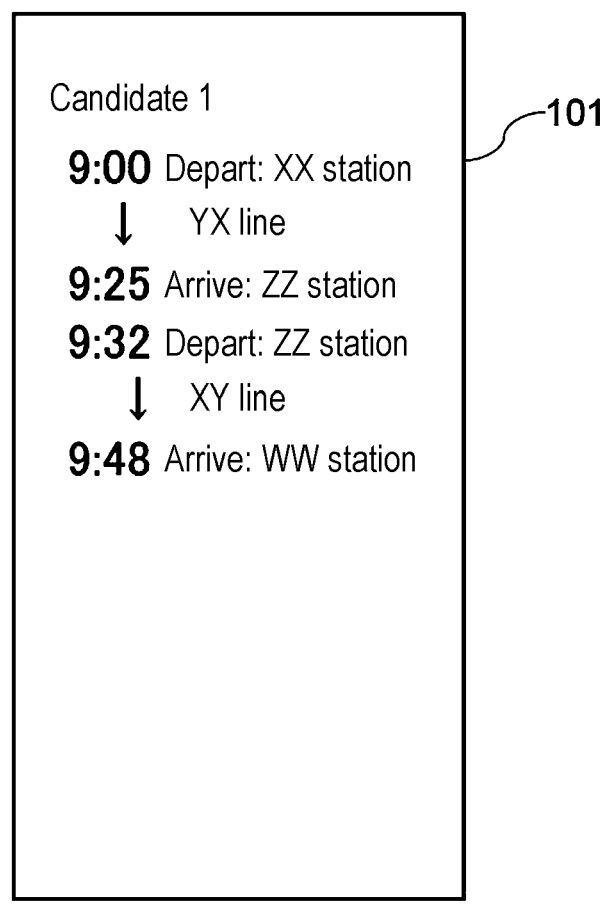
FIG. 34 is a diagram illustrating a display example.

If the user does not close the electronic device 10 after tapping the button 122 displayed on the second display 102, the CPU 11 may perform display control of displaying the candidate for transfer from the departure station to the arrival station on the first display 101, as illustrated in FIG. 34, or need not perform display control on the first display 101.

Figure 35:
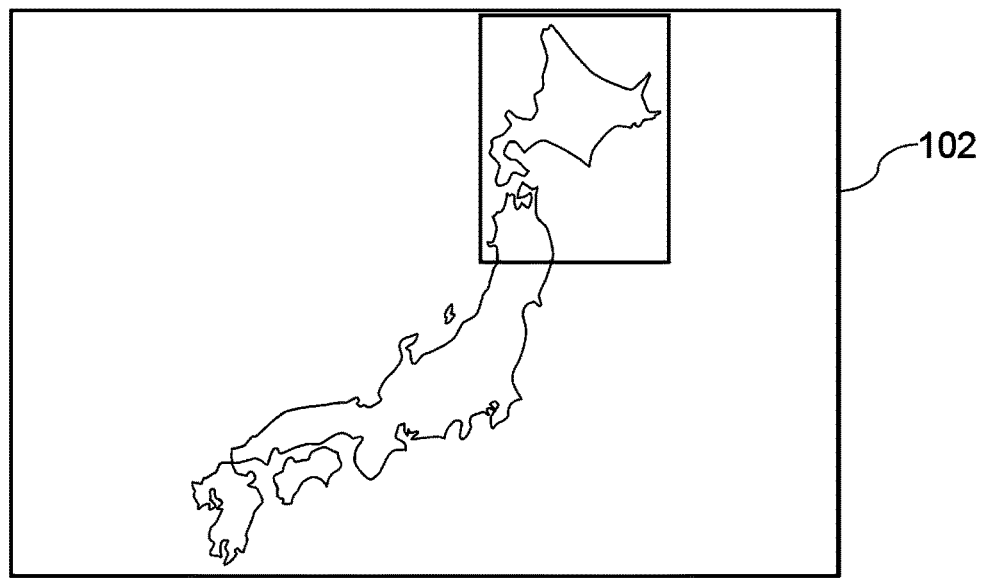
FIG. 35 is a diagram illustrating a display example.

An example in which the CPU 11 performs display control for another application will be discussed. FIG. 35 is a diagram illustrating an example of information displayed on the second display 102. What is illustrated in FIG. 35 is an example in which a map application for displaying a map is displayed on the second display 102. A map of Japan is illustrated in FIG. 35.

Figure 36:
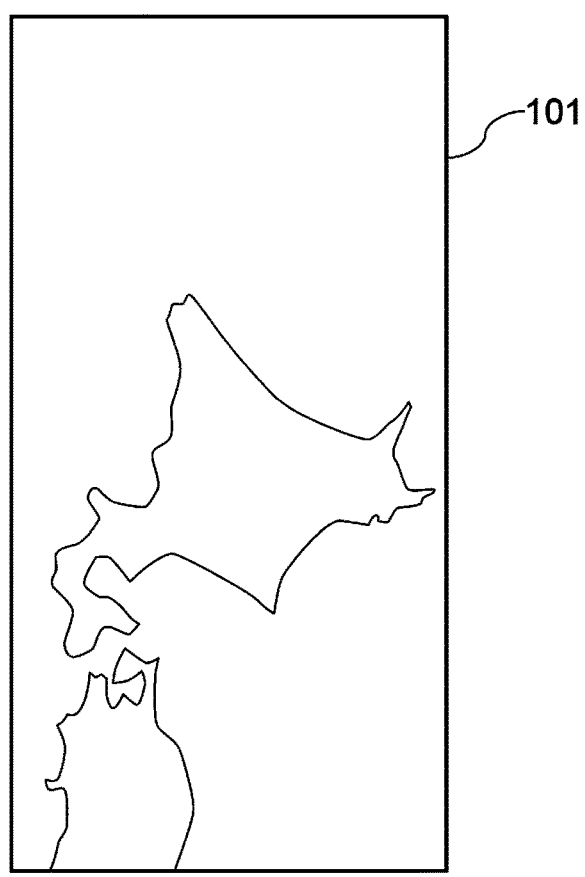
FIG. 36 is a diagram illustrating a display example.

In this state, it is assumed that the user closes the electronic device 10 after performing an operation of selecting part of the map of Japan displayed on the second display 102. For example, it is assumed that the user closes the electronic device 10 after performing an operation of selecting a portion around Hokkaido by performing, for example, a long-touch operation or the like. The CPU 11 may perform display control of displaying, on the first display 101, an enlarged map of the portion selected by the user, as illustrated in FIG. 36.

If the user closes the electronic device 10 without performing a contact operation on the map of Japan, the CPU 11 may perform display control of displaying the map of Japan as it is on the first display 101.

The CPU 11 may display a plurality of applications on the first display 101 or the second display 102. An example of display control in the case where a plurality of applications are displayed on the first display 101 or the second display 102 will be discussed.

Figure 37:
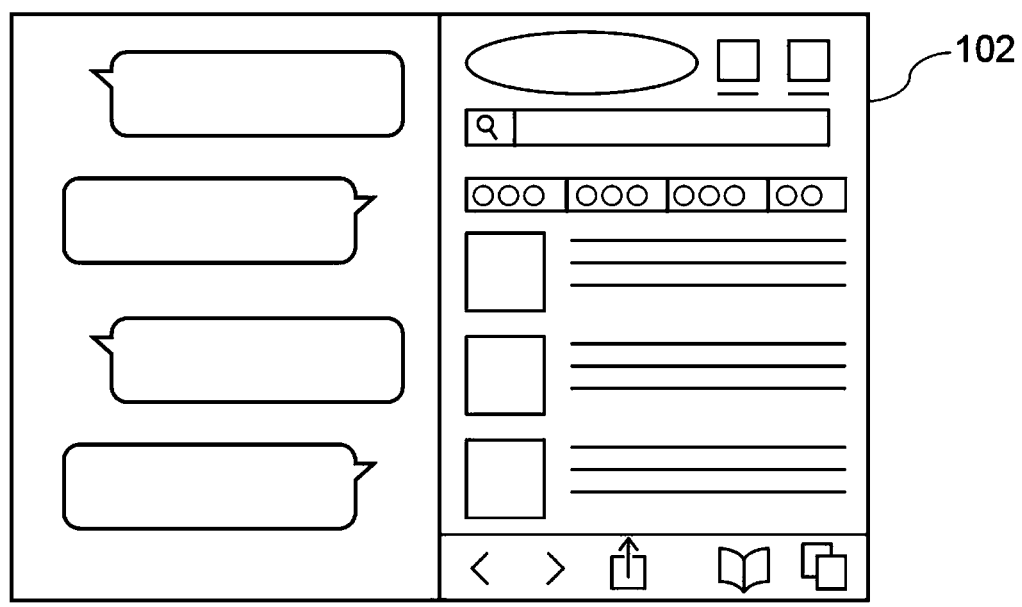
FIG. 37 is a diagram illustrating a display example.

FIG. 37 is a diagram illustrating an example of information displayed on the second display 102. FIG. 37 illustrates an example in which two applications are displayed on the second display 102. On the left side of the second display 102, a chat application for exchanging electronic messages with other users is displayed. On the right side of the second display 102, a web browsing application for browsing web sites on the Internet is displayed. Note that the size of each of the applications displayed on the second display 102 may be changed by a user operation. Although not illustrated in FIG. 37, it is assumed that there is another application running in background of the electronic device 10.

Figure 38:
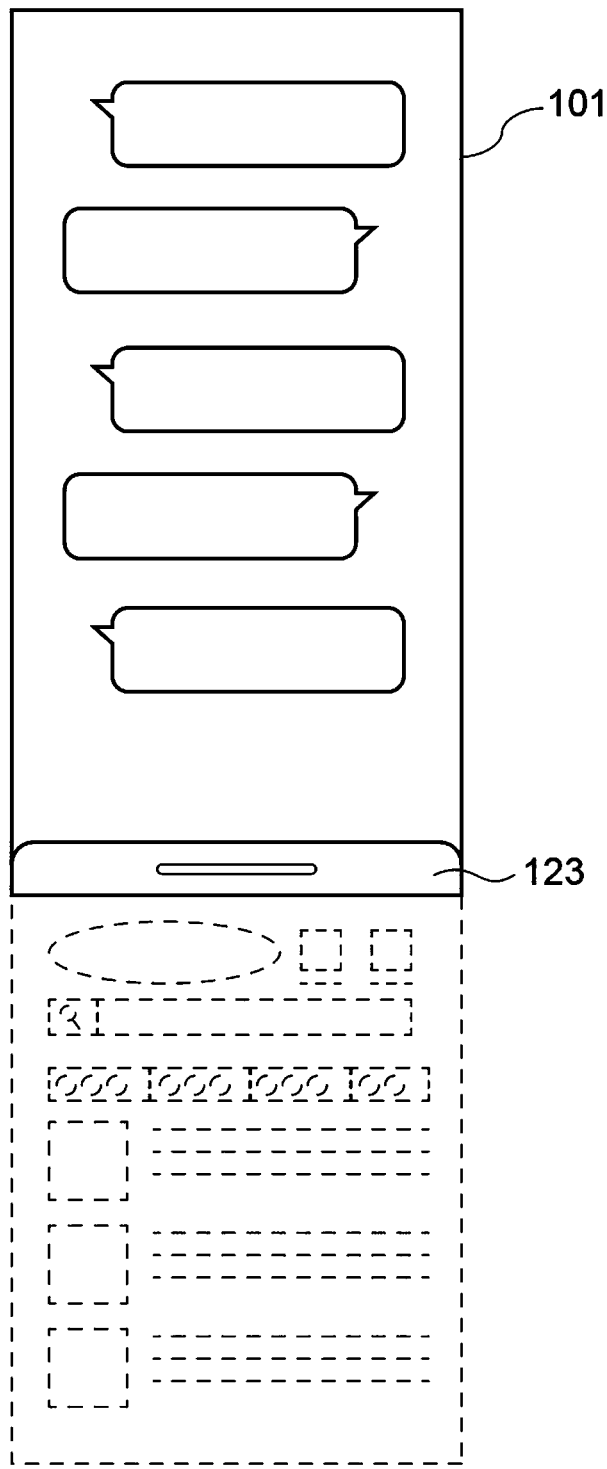
FIG. 38 is a diagram illustrating a display example.

In this state, it is assumed that the user closes the electronic device 10. In this case, the CPU 11 may perform display control on the first display 101 to display either of the applications displayed on the second display 102. FIG. 38 is a diagram illustrating an example of information displayed on the first display 101. FIG. 38 illustrates an example in which the chat application is displayed on the first display 101.

It becomes more convenient for the user when applications displayed on the second display 102 are continuously displayed on the first display 101 even when the user closes the electronic device 10, compared with the case where only one of the applications is displayed. To this end, FIG. 38 illustrates an example in which a tab 123 for displaying the web browsing application when the tab 123 is pulled up by the user is displayed on the first display 101. By displaying the tab 123 on the first display 101, the CPU 11 may improve the convenience for the user, compared with the case in which applications are switched by swiping left and right on the first display 101. Needles to say, the CPU 11 may display the application running in background on the first display 101 in response to the user's swiping left and right on the first display 101.

It is assumed that the user closes the electronic device 10 after performing a predetermined contact operation while a plurality of applications are being displayed on the second display 102. In this case, the application displayed by the CPU 11 on the first display 101 may be the application operated by the user just before the user closes the electronic device 10. Alternatively, in this case, the application displayed by the CPU 11 on the first display 101 may be the application whose display size on the second display 102 is larger.

Figure 39:
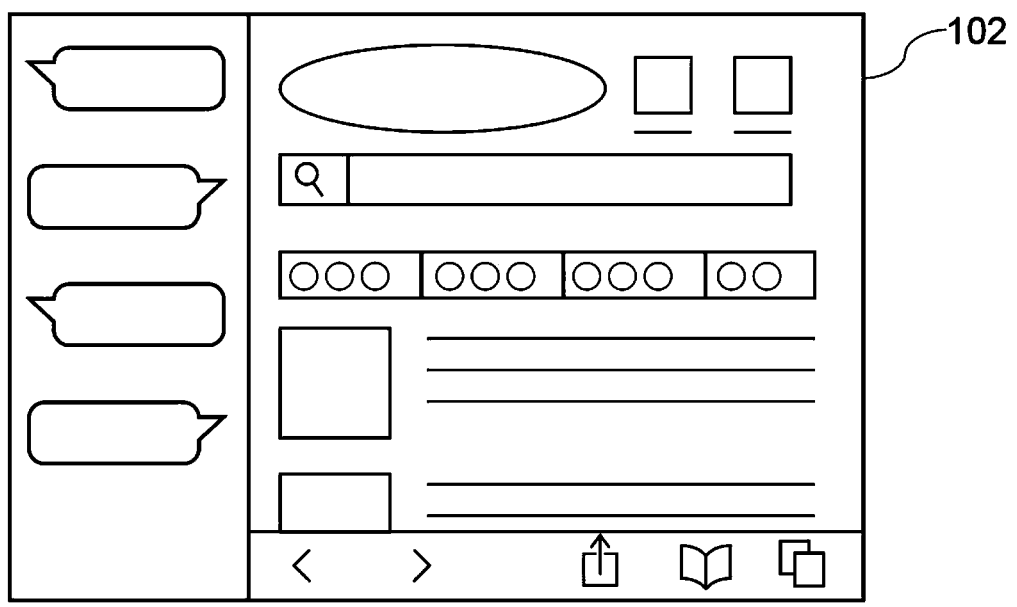
FIG. 39 is a diagram illustrating a display example.
Figure 40:
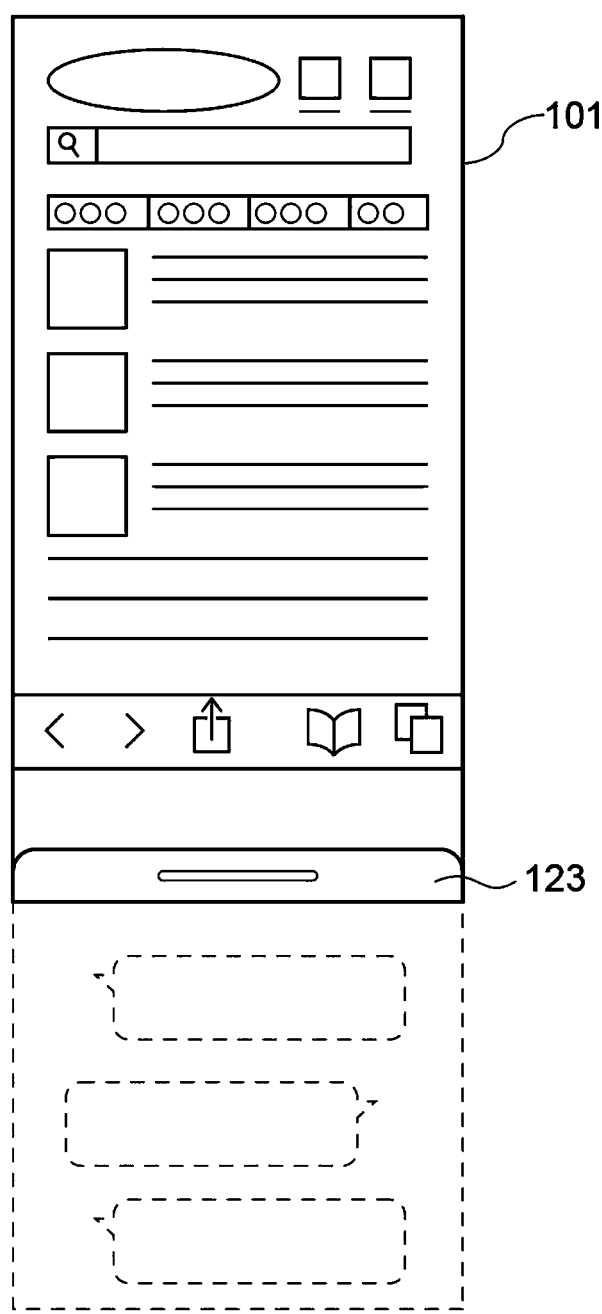
FIG. 40 is a diagram illustrating a display example.

FIG. 39 is a diagram illustrating an example of information displayed on the second display 102, which is an example in which the web browsing application is displayed to be larger than the chat application. In this state, it is assumed that the user closes the electronic device 10 after performing a long-touch operation on the web browsing application. In this case, the CPU 11 may perform display control of displaying the web browsing application, as illustrated in FIG. 40. Also, in this case, the CPU 11 may perform display control of displaying, on the first display 101, the tab 123 for displaying the chat application when the tab 123 is pulled up by the user.

Figure 41:
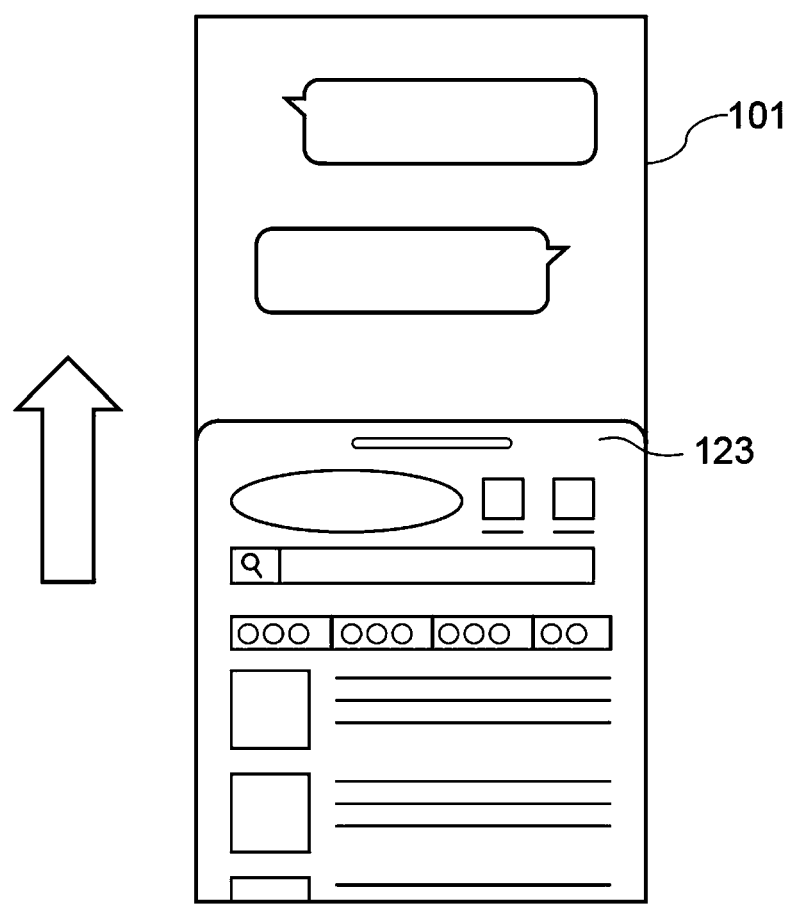
FIG. 41 is a diagram illustrating a display example.
Figure 42:
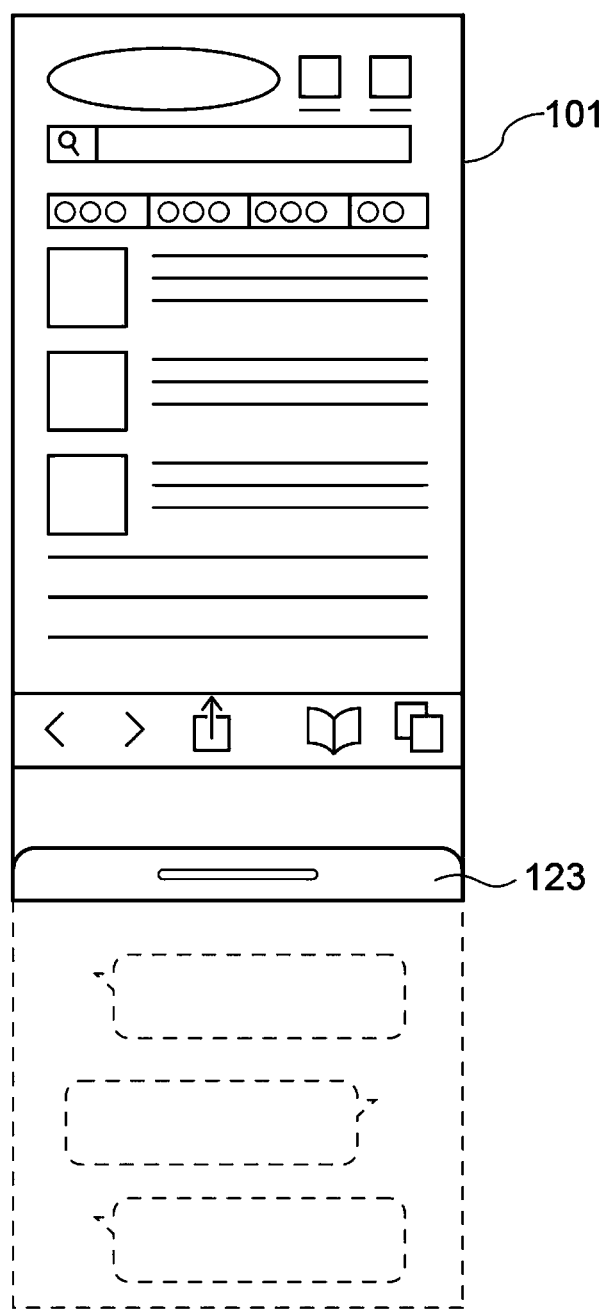
FIG. 42 is a diagram illustrating a display example.

FIG. 41 is a diagram illustrating an example of information displayed on the first display 101. When the user executes a contact operation of pulling the tab 123 upward toward the top of the screen on the first display 101, the CPU 11 performs display control of displaying the web browsing application on the first display 101 in response to pulling up of the tab 123, as illustrated in FIG. 41. When the tab 123 reaches the top of the screen, the CPU 11 performs display control of displaying only the web browsing application on the first display 101, as illustrated in FIG. 42. Furthermore, the CPU 11 performs display control of displaying, on the first display 101, the tab 123 for displaying the chat application when the tab 123 is pulled up by the user, as illustrated in FIG. 42.

The CPU 11 may display a plurality of windows for the same application on the first display 101 or the second display 102. An example of display control in the case where a plurality of windows for the same application are displayed on the first display 101 or the second display 102 will be discussed.

Figure 43:
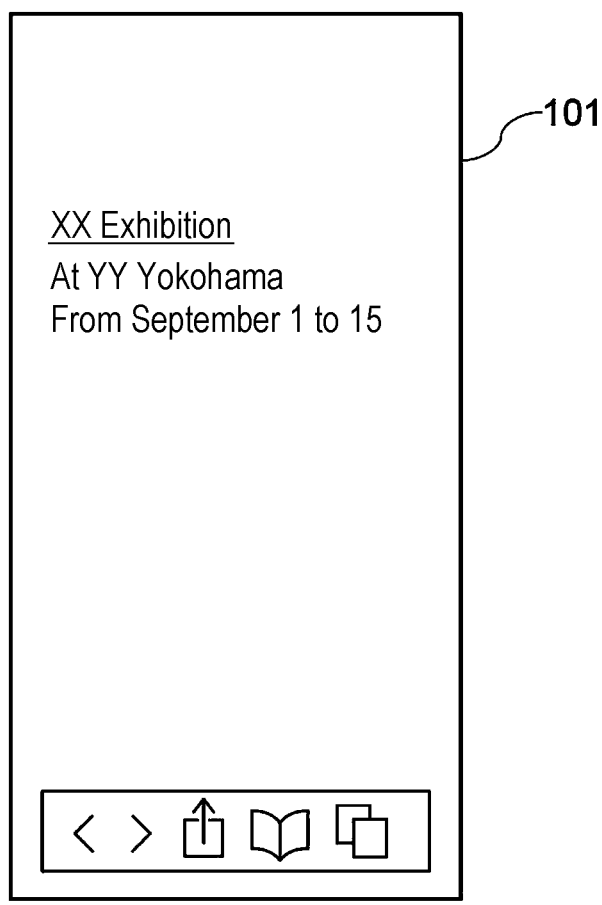
FIG. 43 is a diagram illustrating a display example.

FIG. 43 is a diagram illustrating an example of information displayed on the first display 101. FIG. 43 illustrates an example in which the web browsing application is displayed on the first display 101. FIG. 43 illustrates an example in which the web browsing application displays an Internet article introducing an exhibition.

Figure 44:
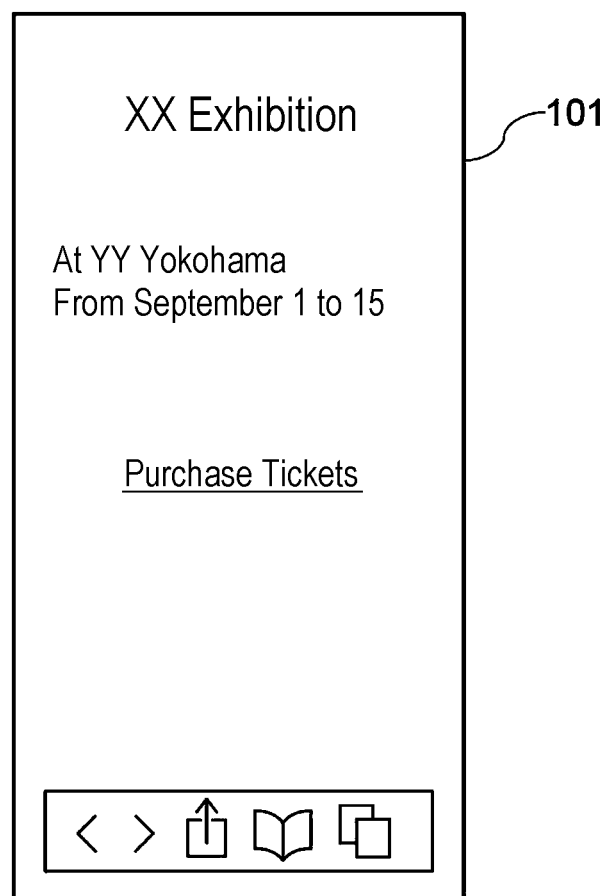
FIG. 44 is a diagram illustrating a display example.

Here, the user taps a place on the first display 101 where a link to the exhibition is placed. In this case, the CPU 11 performs display control on the first display 101 to connect to the exhibition website and display the exhibition page using the web browsing application, as illustrated in FIG. 44. It is assumed that the exhibition page includes a link to the website of the venue and a link to the ticket purchasing site.

When the user opens the electronic device 10 in this state, the CPU 11 may perform display control on the second display 102 in accordance with the contact point and features of a contact operation performed by the user on the first display 101.

Figure 45:
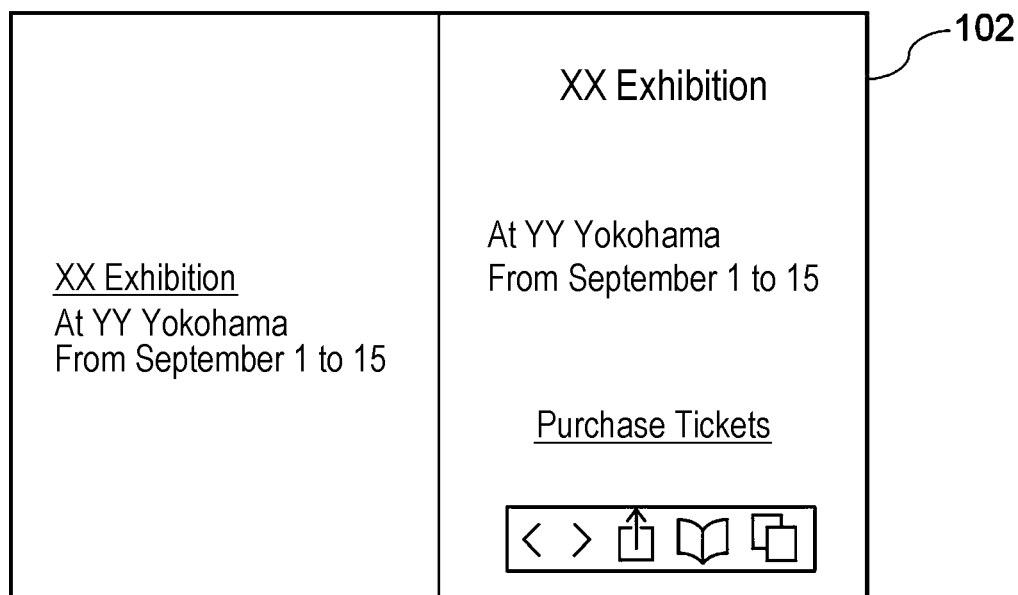
FIG. 45 is a diagram illustrating a display example.

FIG. 45 is a diagram illustrating an example of information displayed on the second display 102. FIG. 45 illustrates an example in which the web browsing application is displayed on the second display 102. In the example illustrated in FIG. 45, the CPU 11 displays the previous page displayed on the first display 101 before the electronic device 10 is opened on the left side of the second display 102, and displays the page displayed on the first display 101 on the right side of the second display 102. In short, the CPU 11 displays the Internet article introducing an exhibition on the left side of the second display 102, and displays the exhibition page on the right side.

Figure 46:
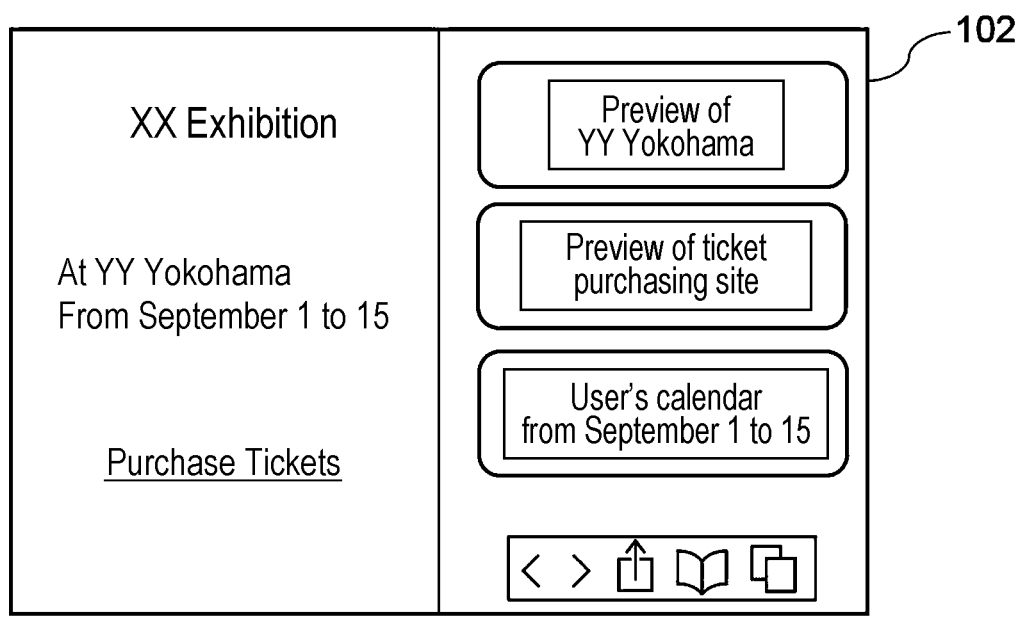
FIG. 46 is a diagram illustrating a display example.

FIG. 46 is a diagram illustrating an example of information displayed on the second display 102. FIG. 46 illustrates an example in which the web browsing application is displayed on the second display 102. In the example illustrated in FIG. 46, the CPU 11 displays the page displayed on the first display 101 before the electronic device 10 is opened on the left side of the second display 102. Also, in the example illustrated in FIG. 46, the CPU 11 displays pages to which the page displayed on the first display 101 is linked, and the user's calendar information on the right side of the second display 102. In short, the CPU 11 displays the exhibition page on the left side of the second display 102, and displays the page of the venue of the exhibition, the page of the ticket purchasing site, and the user's calendar during the exhibition period on the right side. The CPU 11 displays the user's calendar information on the basis of information described on the exhibition page. The CPU 11 may perform display control of displaying, besides the user's calendar information or in addition to the user's calendar information, a map of the venue of the exhibition on the second display 102 on the basis of information obtained from the page displayed on the first display 101.

Figure 47:
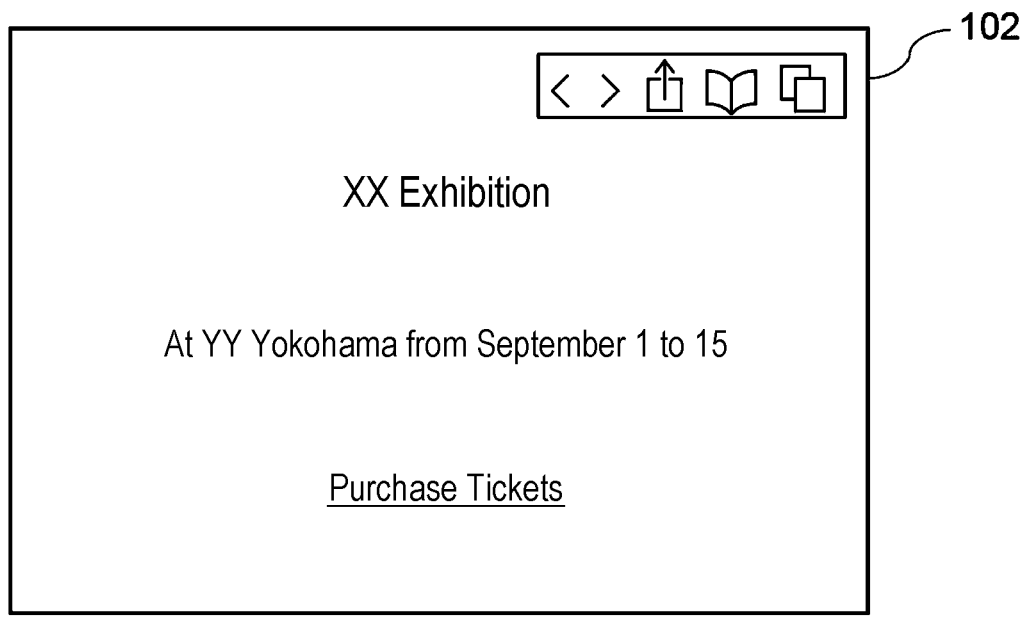
FIG. 47 is a diagram illustrating a display example.

FIG. 47 is a diagram illustrating an example of information displayed on the second display 102. FIG. 47 illustrates an example in which the web browsing application is displayed on the second display 102. In the example illustrated in FIG. 47, the CPU 11 displays the page displayed on the first display 101 before the electronic device 10 is opened on the entire second display 102. In short, the CPU 11 displays the exhibition page on the entire second display 102. In the case where the CPU 11 displays the page displayed on the first display 101 on the entire second display 102, the CPU 11 may perform display control of displaying the previous page displayed on the first display 101 on the first display 101.

Which of the states illustrated in FIGS. 45 to 47 is displayed on the second display 102 when the user opens the electronic device 10 is determined in accordance with the contact point and features of a contact operation performed by the user on the first display 101. For example, when the user long-touches a place on the first display 101 where no information is displayed and then opens the electronic device 10, the CPU 11 may perform display control on the second display 102 to proceed to the state illustrated in FIG. 45. Alternatively, for example, when the user long-touches a place on the first display 101 where a link is placed and then opens the electronic device 10, the CPU 11 may perform display control on the second display 102 to proceed to the state illustrated in FIG. 46. Alternatively, for example, when the user opens the electronic device 10 without performing any contact operation on the first display 101, the CPU 11 may perform display control on the second display 102 to proceed to the state illustrated in FIG. 47.

Although the specific examples of the display control process performed by the CPU 11 have been described above, needless to say, applications executed on the electronic device 10 are not limited to those in the above-described examples. The CPU 11 may execute display control on the first display 101 and the second display 102 in accordance with applications executed on the electronic device 10. In addition, the features of a contact operation performed by the user on the first display 101 and the second display 102 are not limited to those in the above-described examples.

Note that the display control process executed by the CPU by reading software (program) in the above-described exemplary embodiment may be executed by various processors other than the CPU. In this case, examples of the processor include a programmable logic device (PLD) whose circuit configuration is changeable after manufacturing, such as a field-programmable gate array (FPGA), and a dedicated electric circuit that is a processor with a circuit configuration designed specifically for executing a specific process, such as an application specific integrated circuit (ASIC). In addition, the display control process may be executed by one of these various processors, or by a combination of two or more processors of the same type or different types (such as a plurality of FPGAs, a combination of a CPU and an FPGA, and so forth). The hardware structure of these various processors is, more specifically, an electric circuit combining circuit elements such as semiconductor elements.

Although the mode in which the program for the display control process is stored (installed) in the ROM or the storage in advance has been described in the above-described exemplary embodiment, the mode is not limited to the above mode. The mode may be such that the program is provided by being recorded in a non-transitory recording medium, such as a compact disc read-only memory (CD-ROM), a digital versatile disc read-only memory (DVD-ROM), or a Universal Serial Bus (USB) flash drive. In addition, the mode may be such that the program is downloaded from an external apparatus via a network.

The operation of the processor in the above-described exemplary embodiment may be implemented not only by one processor, but by plural processors in collaboration which are located physically apart from each other but may work cooperatively. The order of operations of the processor is not limited to one described in the exemplary embodiment above, and may be changed as appropriate.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A foldable device with a folding portion, comprising:
a processor;
a first display and a second display, only one of which being capable of presenting information to a user when the device is closed,
wherein the processor is configured to perform, in response to a change in a folding angle of the folding portion within a predetermined time from a user operation received on one of the first display and the second display, second display control on an other one of the first display and the second display, wherein the second display control on the other one of the first display and the second display is in accordance with content displayed at a point that received the user operation.

2. The device of claim 1,
wherein the processor is configured to perform, in response to the user operation received on the one of the first display and the second display, first display control to change content displayed on the one of the first display and the second display from a first state to a second state.

3. The device of claim 2,
wherein the first display control changes the content displayed on the one of the first display and the second display from a first page to a second page,
wherein the second display control displays the first page and the second page concurrently on the other one of the first display and the second display.

4. The device of claim 1,
wherein the second display control displays a plurality of pages displayed by a single application concurrently on the other one of the first display and the second display.

5. The device of claim 1,
wherein the second display control concurrently displays content of a plurality of applications on the other one of the first display and the second display.

6. The device of claim 5,
wherein the second display control concurrently displays content of a first application that was displaying content on the one of the first display and the second display at the reception of the user operation and content of a second application that was not displaying content on the one of the first display and the second display at the reception of the user operation.

7. The device of claim 1,
wherein the user operation selects a portion of the content displayed on the one of the first display and the second display.

8. The device of claim 7,
wherein the second display control displays on the other one of the first display and the second display the portion selected by the user operation.

9. The device of claim 8,
wherein the second display control displays the portion selected by the user operation at a center of the other one of the first display and the second display.

10. The device of claim 8,
wherein the second display control displays the portion selected by the user operation at a top of the other one of the first display and the second display.

11. The device of claim 7,
wherein the portion selected by the user operation is a portion of content displayed by a file viewing application or a web browsing application.

12. The device of claim 11,
wherein the portion selected by the user operation is a portion of text.

13. The device of claim 11,
wherein the portion selected by the user operation is a portion of an image.

14. The device of claim 1,
wherein the content is a screen displaying a plurality of icons and the portion selected by the user operation is a background of the screen.

15. The device of claim 1,
wherein the processor is configured to provide, in response to the receipt of the user operation, a visual feedback of a selection made by the user operation,
wherein the processor is configured to end the visual feedback when the predetermined time expires.

16. The device of claim 1,
wherein the change in the folding angle of the folding portion is closing the device or opening the device.

17. The device of claim 1,
wherein at least one of the first display and the second display include portions disposed on both sides of a fold at the folding portion.

18. A non-transitory computer readable medium storing a computer program causing a device configured to be foldable by a folding portion to execute a process, the device including:
a processor; and
a first display and a second display, only one of which being capable of presenting information to a user when the device is closed,
wherein the process comprising performing, in response to a change in a folding angle of the folding portion within a predetermined time from a user operation received on one of the first display and the second display, second display control on an other one of the first display and the second display,
wherein the second display control on the other one of the first display and the second display is in accordance with content displayed at a point that received the user operation.

* * * * *